(12) United States Patent
    Kaneda

(10) Patent No.: US 11,054,944 B2
(45) Date of Patent:    Jul. 6, 2021

(54) PROJECTION DISPLAY UNIT AND FUNCTION CONTROL METHOD

(71) Applicant: Sony Corporation, Tokyo (JP)

(72) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/502,231

(22) PCT Filed: Aug. 28, 2015

(86) PCT No.: PCT/JP2015/004369
§ 371 (c)(1),
(2) Date: Feb. 7, 2017

(87) PCT Pub. No.: WO2016/038839
PCT Pub. Date: Mar. 17, 2016

(65) Prior Publication Data
US 2017/0228057 A1    Aug. 10, 2017

(30) Foreign Application Priority Data

Sep. 9, 2014    (JP) .............................. JP2014-182976

(51) Int. Cl.
*G06F 3/042*    (2006.01)
*G03B 17/54*    (2021.01)
(Continued)

(52) U.S. Cl.
CPC ............. *G06F 3/042* (2013.01); *G03B 17/54* (2013.01); *G06F 1/1639* (2013.01); *G06F 3/005* (2013.01);
(Continued)

(58) Field of Classification Search
CPC .... G06F 3/042; G06F 1/1639; G06F 3/04886; G06F 3/0425; G06F 3/005; G06F 3/017;
(Continued)

(56) References Cited

U.S. PATENT DOCUMENTS 10,013,116 B2    7/2018  Kaneda
10,244,217 B2    3/2019  Kaneda et al.
(Continued)

FOREIGN PATENT DOCUMENTS

CN    2 802 536 Y    8/2006
CN    102033662 A    4/2011
(Continued)

OTHER PUBLICATIONS

International Search Report and Written Opinion dated Feb. 22, 2016 in connection with International Application No. PCT/JP2015/004369.

(Continued)

*Primary Examiner* — Jose R Soto Lopez
(74) *Attorney, Agent, or Firm* — Wolf, Greenfield & Sacks, P.C.

(57) ABSTRACT

A projection display unit and a function control method. The projection display unit includes: a projection optical system including an illumination section, a projection lens, and a light valve; and a detection optical system including an image pickup device, the image pickup device being disposed in a position optically conjugating with the light valve, wherein: the detection optical system is configured to detect whether an input operation is performed in a peripheral region of a projection region on a projection surface, and in response to detection by the detection optical system in the peripheral region, a specific function is caused to be executed.

20 Claims, 12 Drawing Sheets

(51) Int. Cl.

| | | |
|---|---|---|
| *H04N 9/31* | (2006.01) | |
| *G06F 1/16* | (2006.01) | |
| *G06F 3/0488* | (2013.01) | |
| *G06F 3/00* | (2006.01) | |
| *G06F 3/01* | (2006.01) | |
| *G06F 3/02* | (2006.01) | |
| *G06F 3/041* | (2006.01) | |
| *G06F 3/0482* | (2013.01) | |
| *G06K 9/00* | (2006.01) | |

(52) U.S. Cl.
CPC ............ *G06F 3/017* (2013.01); *G06F 3/0219* (2013.01); *G06F 3/041* (2013.01); *G06F 3/0425* (2013.01); *G06F 3/0482* (2013.01); *G06F 3/0488* (2013.01); *G06F 3/04886* (2013.01); *G06K 9/00355* (2013.01); *H04N 9/3176* (2013.01); *H04N 9/3194* (2013.01); *G09G 2340/0471* (2013.01); *G09G 2340/0478* (2013.01); *G09G 2354/00* (2013.01); *H04N 9/31* (2013.01)

(58) Field of Classification Search
CPC ...... G06F 3/0219; G06F 3/041; G06F 3/0482; G06F 3/0488; H04N 9/3176; H04N 9/3194; H04N 9/31; G06K 9/00355; G03B 17/54; G09G 2340/0471; G09G 2340/0478; G09G 2354/00
See application file for complete search history.

(56) References Cited

U.S. PATENT DOCUMENTS

| | | | |
|---|---|---|---|
| 10,602,108 B2 | 3/2020 | Kaneda et al. | |
| 2003/0226968 A1* | 12/2003 | Montellese | G06F 3/0428 250/341.1 |
| 2004/0141162 A1 | 7/2004 | Olbrich | |
| 2005/0168448 A1* | 8/2005 | Simpson | G06F 3/0418 345/173 |
| 2007/0263174 A1 | 11/2007 | Shyu et al. | |
| 2009/0046253 A1 | 2/2009 | Sunaga | |
| 2009/0262098 A1* | 10/2009 | Yamada | G06F 1/1639 345/175 |
| 2010/0079733 A1 | 4/2010 | Lu | |
| 2010/0091246 A1 | 4/2010 | Yamamoto | |
| 2010/0171909 A1* | 7/2010 | Handschy | H04N 9/3167 349/98 |
| 2010/0201895 A1* | 8/2010 | Golub | H04N 5/2256 348/759 |
| 2010/0296060 A1 | 11/2010 | Huang | |
| 2011/0191690 A1* | 8/2011 | Zhang | G06F 3/00 715/746 |
| 2011/0241986 A1 | 10/2011 | Feng et al. | |
| 2011/0267260 A1 | 11/2011 | Jang et al. | |
| 2012/0044208 A1* | 2/2012 | Yun | G06F 3/0426 345/175 |
| 2012/0280941 A1* | 11/2012 | Hu | G03B 33/12 345/175 |
| 2012/0313910 A1* | 12/2012 | Haraguchi | G06F 3/0425 345/207 |
| 2013/0069994 A1* | 3/2013 | Nishigaki | H04N 9/3161 345/690 |
| 2013/0241820 A1* | 9/2013 | Keh | G06F 3/1454 345/156 |
| 2013/0257811 A1* | 10/2013 | Usuda | G06F 3/0425 345/175 |
| 2013/0342704 A1* | 12/2013 | Williams | G06F 3/03542 348/164 |
| 2014/0125704 A1* | 5/2014 | Sievert | G06F 3/011 345/633 |
| 2014/0218300 A1 | 8/2014 | Muraki et al. | |
| 2014/0267031 A1* | 9/2014 | Huebner | G06F 3/0346 345/158 |
| 2014/0362052 A1* | 12/2014 | McCaughan | G06F 3/0421 345/175 |
| 2015/0123905 A1* | 5/2015 | Bailen | G06F 3/03543 345/163 |
| 2015/0177601 A1* | 6/2015 | Imai | G06F 3/0304 353/85 |
| 2015/0213309 A1* | 7/2015 | Hara | G01B 11/002 345/156 |
| 2016/0021351 A1 | 1/2016 | Yamagishi et al. | |
| 2016/0239154 A1* | 8/2016 | Suggs | H04N 9/3141 |
| 2016/0306418 A1* | 10/2016 | Davis | A63F 13/10 |
| 2017/0208305 A1* | 7/2017 | Kaneda | H04N 9/3167 |
| 2017/0351324 A1* | 12/2017 | Njolstad | G06F 3/011 |
| 2019/0174105 A1* | 6/2019 | Kaneda | H04N 9/317 |

FOREIGN PATENT DOCUMENTS

| | | |
|---|---|---|
| CN | 102156593 A | 8/2011 |
| CN | 103376636 A | 10/2013 |
| CN | 103425964 A | 12/2013 |
| CN | 103777358 A | 5/2014 |
| EP | 2120455 A1 | 11/2009 |
| EP | 3 550 359 A1 | 10/2019 |
| JP | 09-305312 A | 11/1997 |
| JP | 2000-259338 A | 9/2000 |
| JP | 2003-044839 A | 2/2003 |
| JP | 2004-126997 A | 4/2004 |
| JP | 2006-065558 A | 3/2006 |
| JP | 2007-052218 A | 3/2007 |
| JP | 2008-257125 A | 10/2008 |
| JP | 2010-538685 A | 12/2010 |
| JP | 2011-209531 A | 10/2011 |
| JP | 2012-083871 A | 4/2012 |
| JP | 2012-256000 A | 12/2012 |
| JP | 2013-120586 A | 6/2013 |
| JP | 2013-168922 A | 8/2013 |
| JP | 2014-092715 A | 5/2014 |
| JP | 2015-064550 A | 4/2015 |
| WO | WO 2014/141718 A1 | 9/2014 |
| WO | WO 2015/029365 A1 | 3/2015 |

OTHER PUBLICATIONS

International Preliminary Report on Patentability thereof dated Mar. 23, 2017 in connection with International Application No. PCT/JP2015/004369.

European Communication Pursuant to Article 94(3) EPC dated Apr. 30, 2020 in connection with European Application No. 15 767 337.7.

Japanese Office Action dated Jun. 11, 2019 in connection with Japanese Application No. 2016-538204 and English translation thereof.

Chinese Office Action dated May 20, 2019 in connection with Chinese Application No. 201580041613.2, and English translation thereof.

Communication Pursuant to Article 94(3) dated Jun. 22, 2018 in connection with European Application No. 15826795.5.

Extended European Search Report dated Nov. 30, 2017 in connection with European Application No. 15826795.5.

Japanese Office Action dated Dec. 5, 2017 in connection with Japanese Application No. 2014-182976, and English translation thereof.

International Preliminary Report on Patentability and English translation thereof dated Feb. 9, 2017 in connection with International Application No. PCT/JP2015/066992.

International Search Report and Written Opinion and English translation thereof dated Sep. 8, 2015 in connection with International Application No. PCT/JP2015/066992.

U.S. Appl. No. 15/327,710, filed Jan. 20, 2017, Kaneda et al.
U.S. Appl. No. 16/210,456, filed Dec. 5, 2018, Kaneda et al.

* cited by examiner

[Fig. 1]
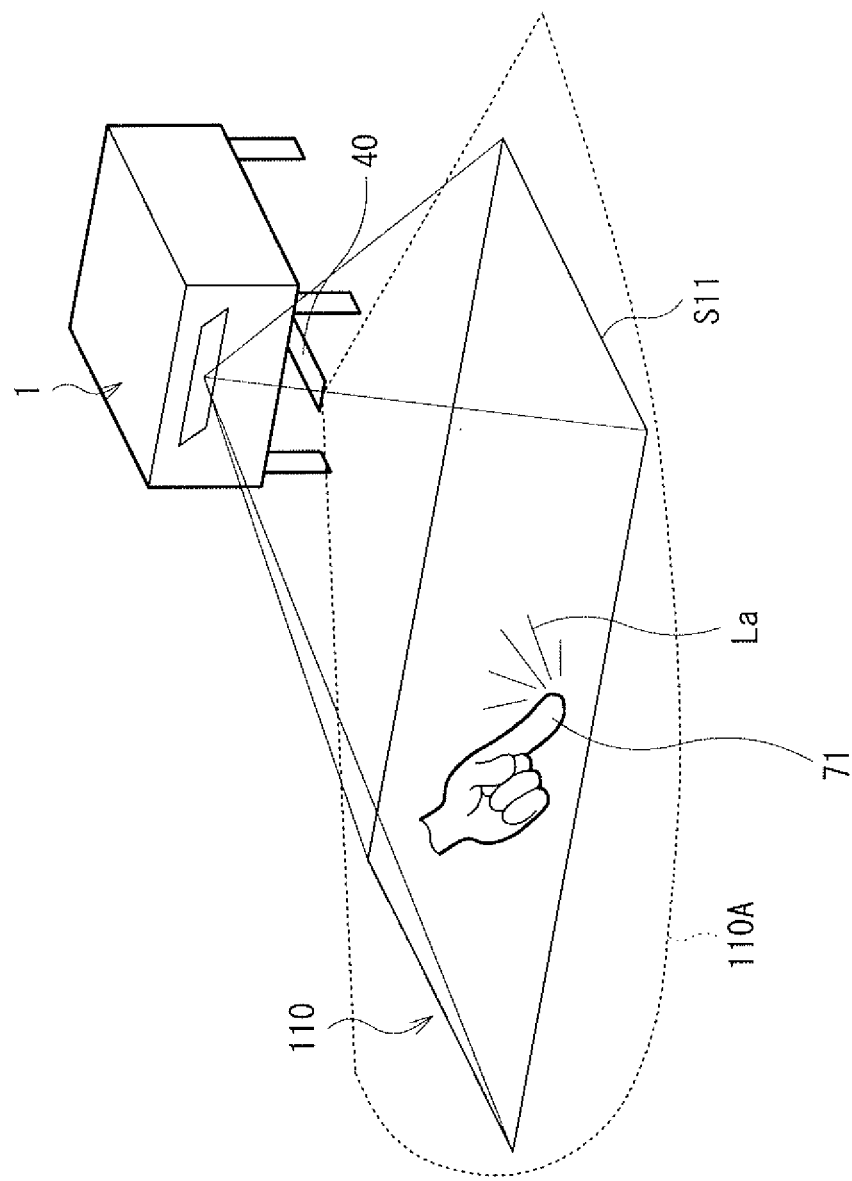

[Fig. 2]
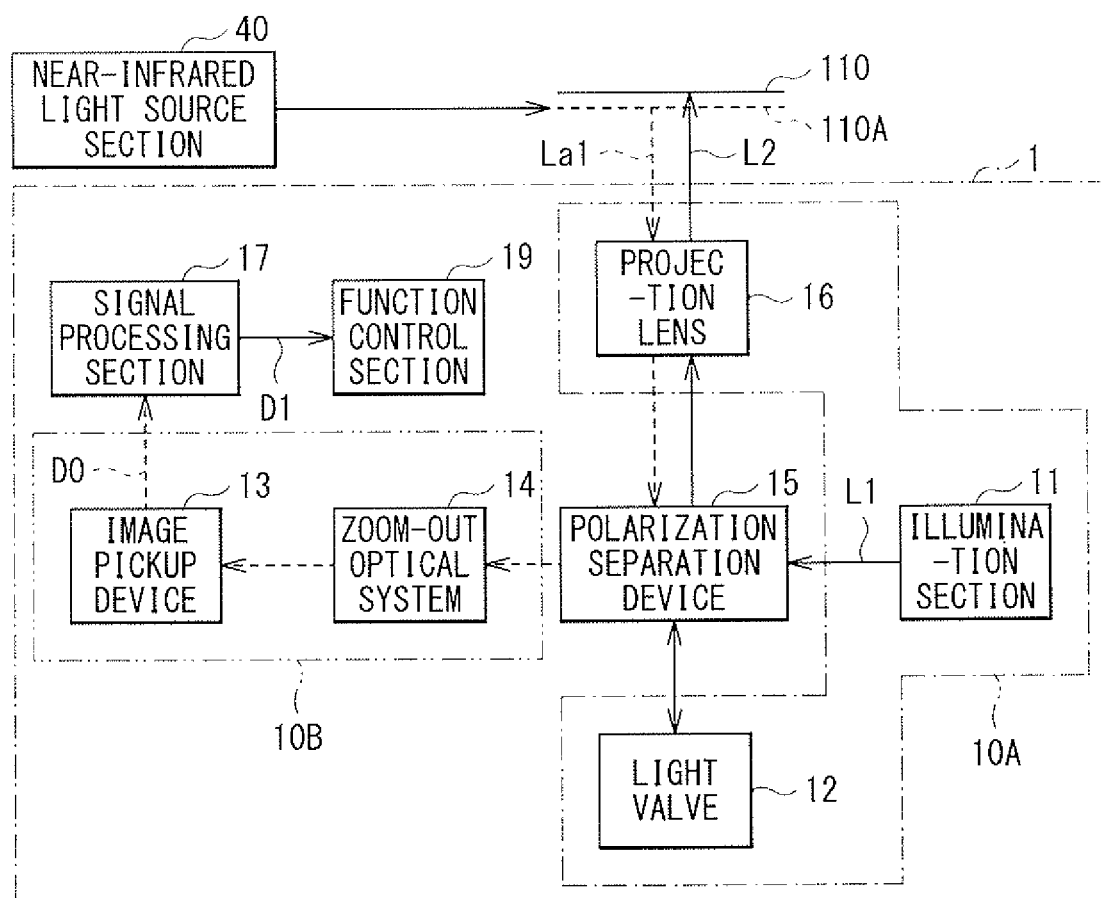

[Fig. 3]
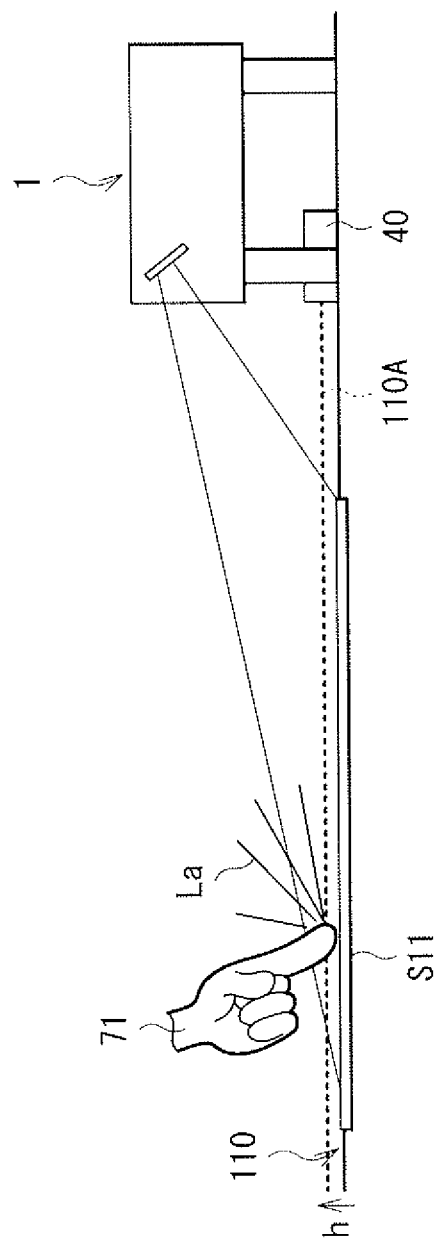

[Fig. 4]
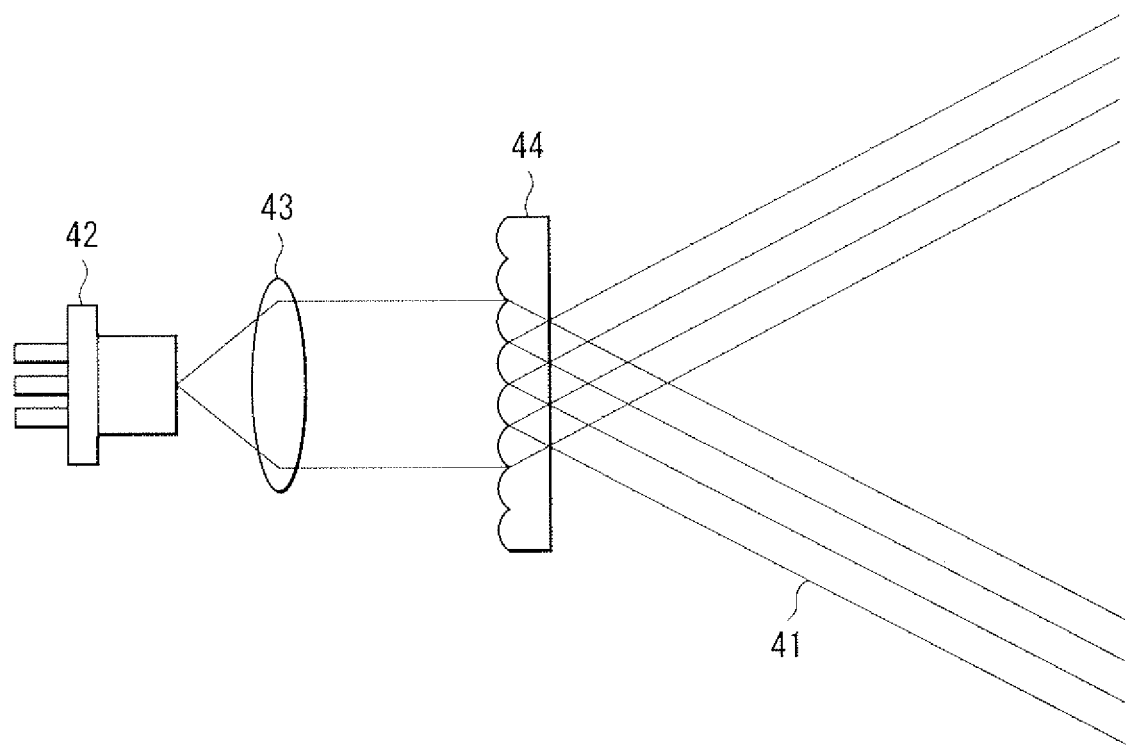
[Fig. 5A]
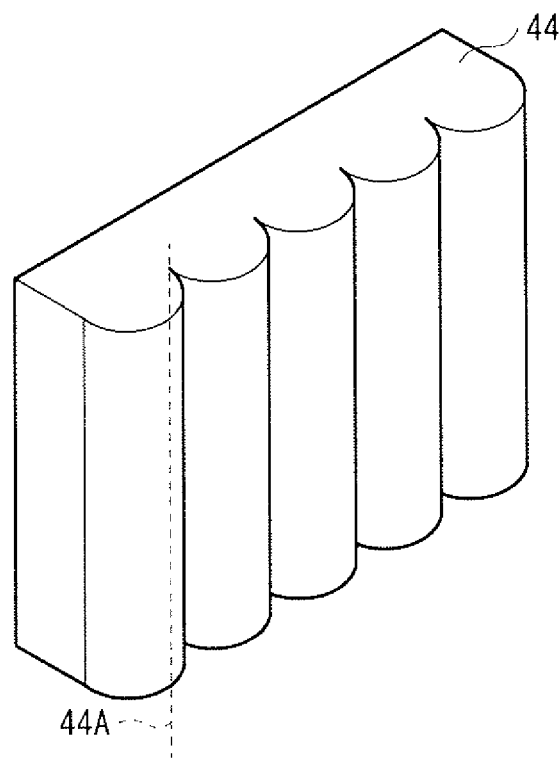

[Fig. 5B]
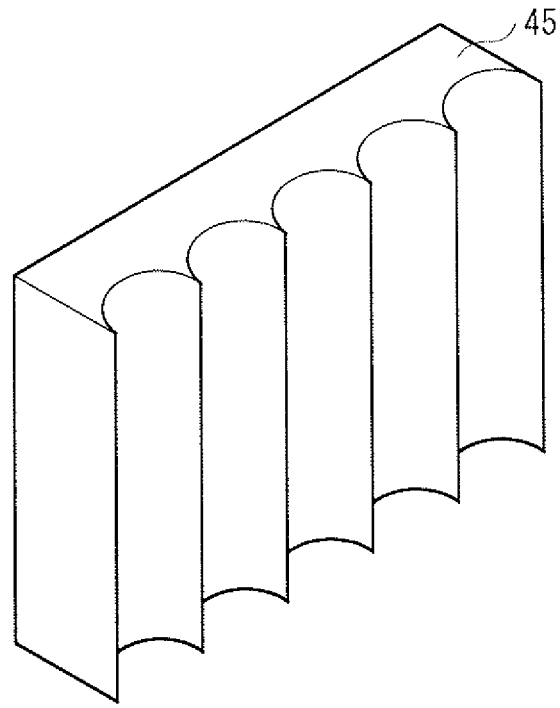
[Fig. 6]
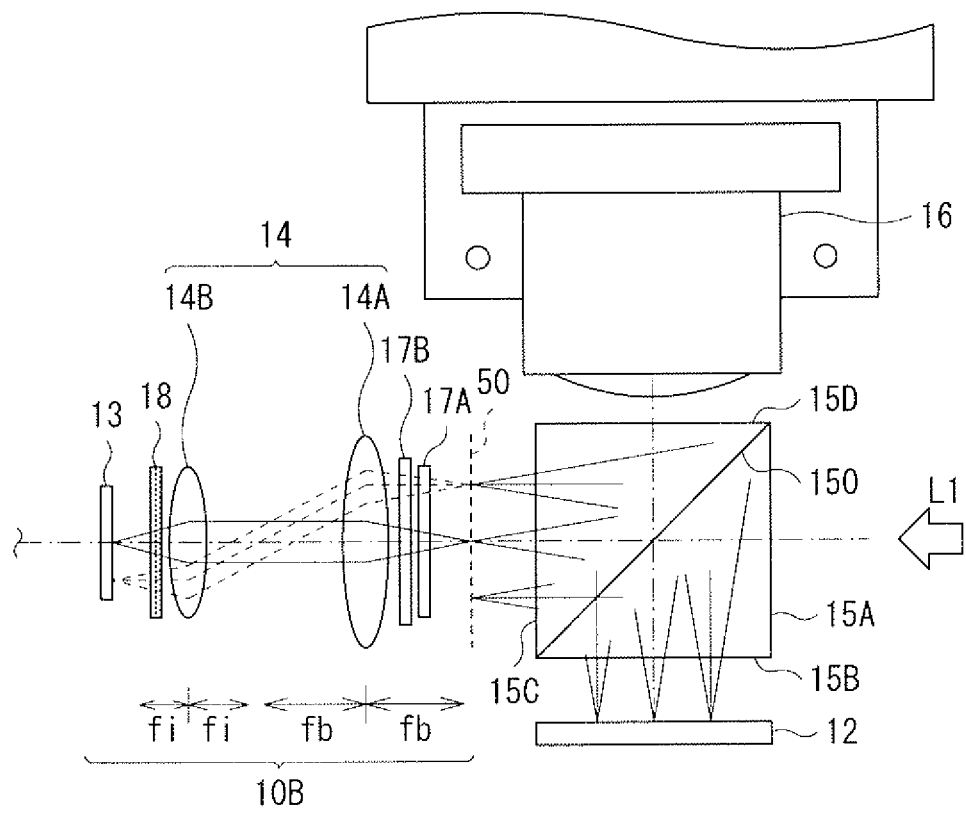

[Fig. 7]
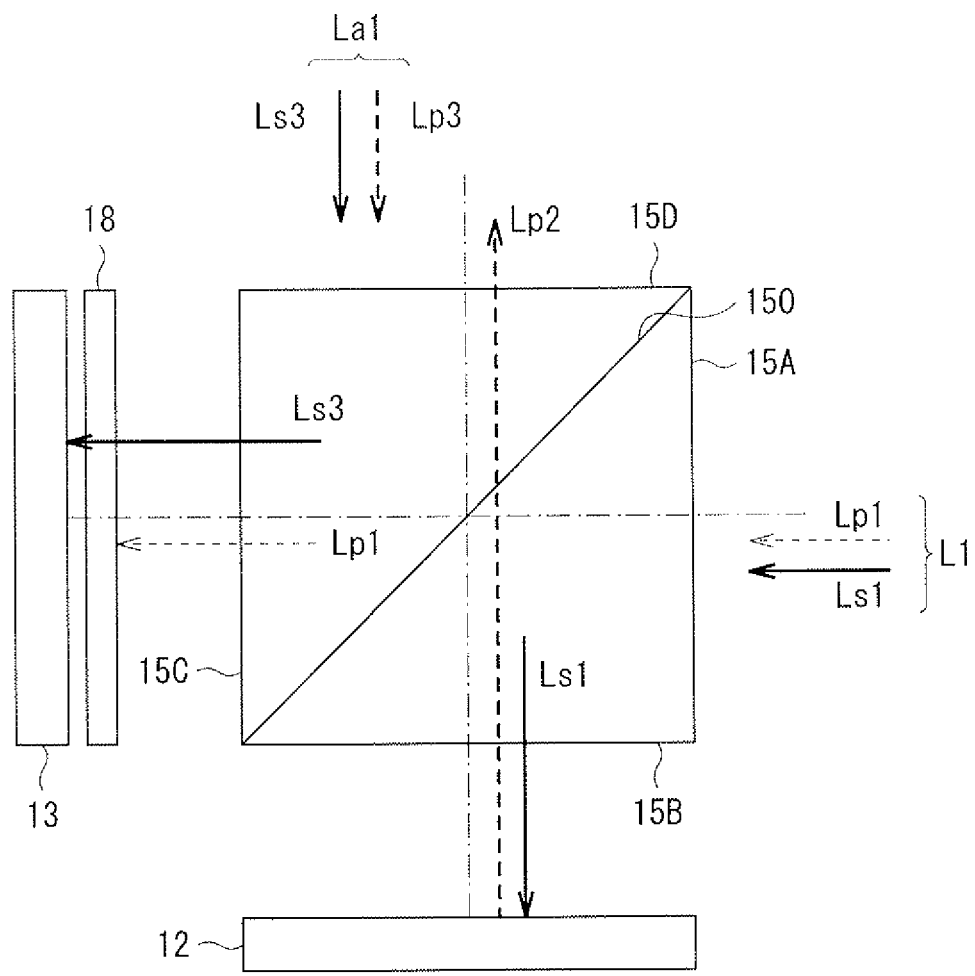

[Fig. 8A]
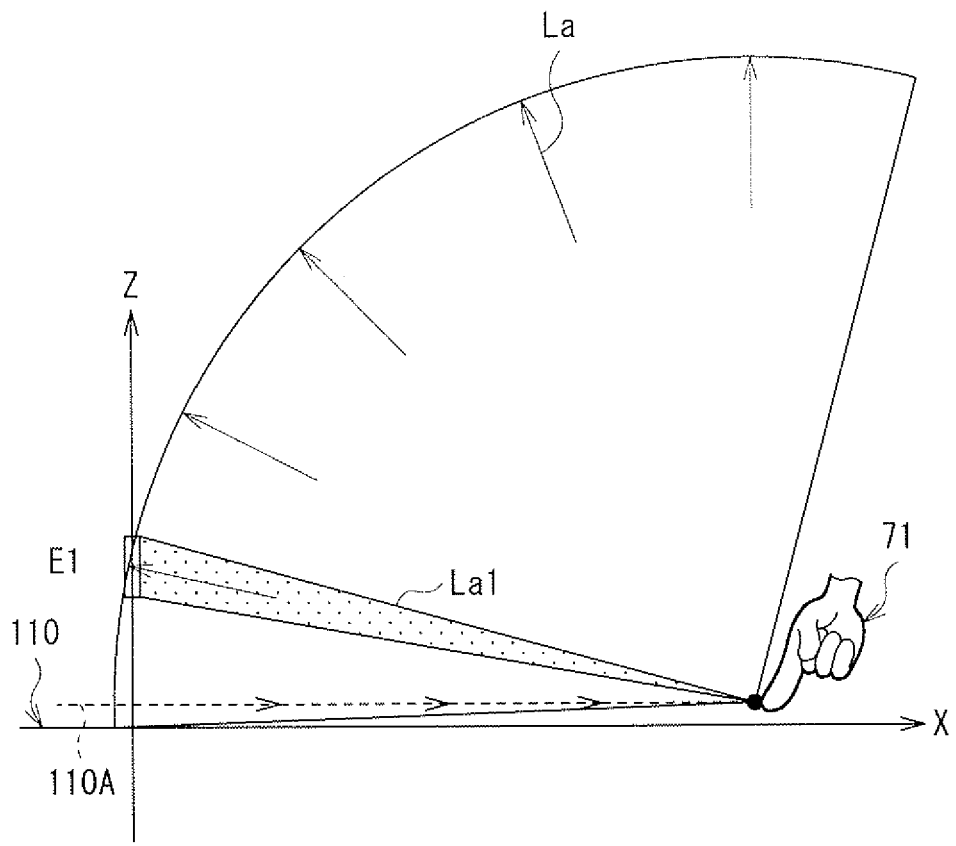
[Fig. 8B]
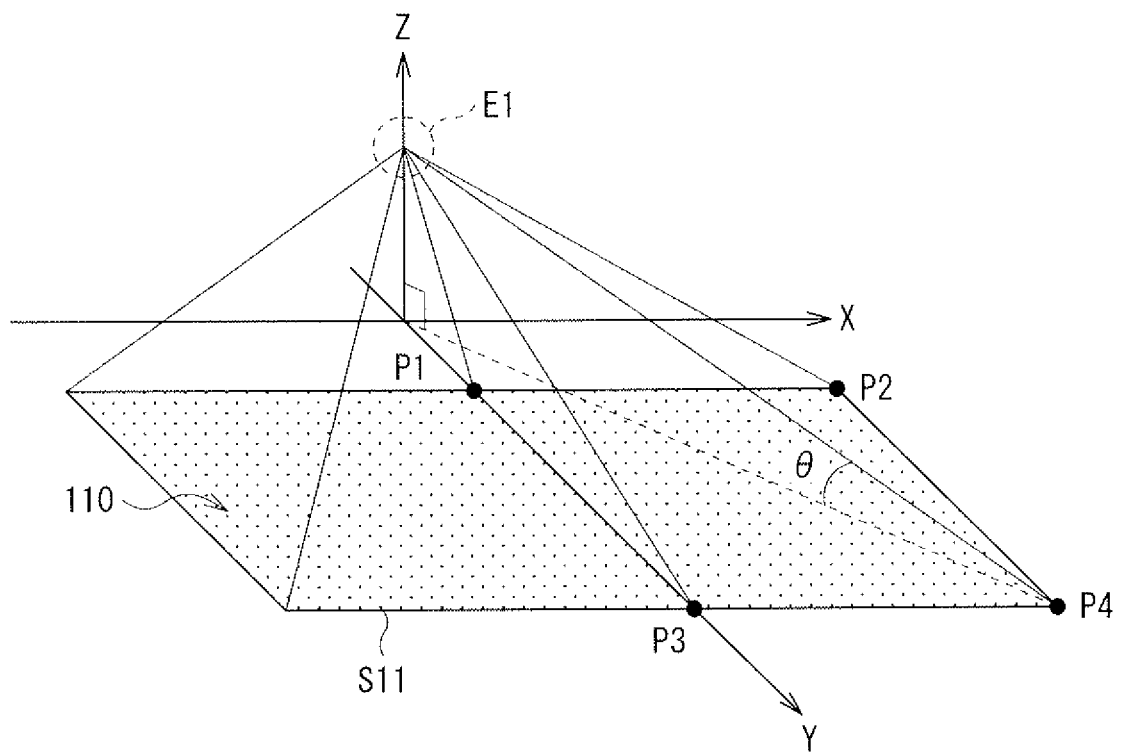

[Fig. 9]
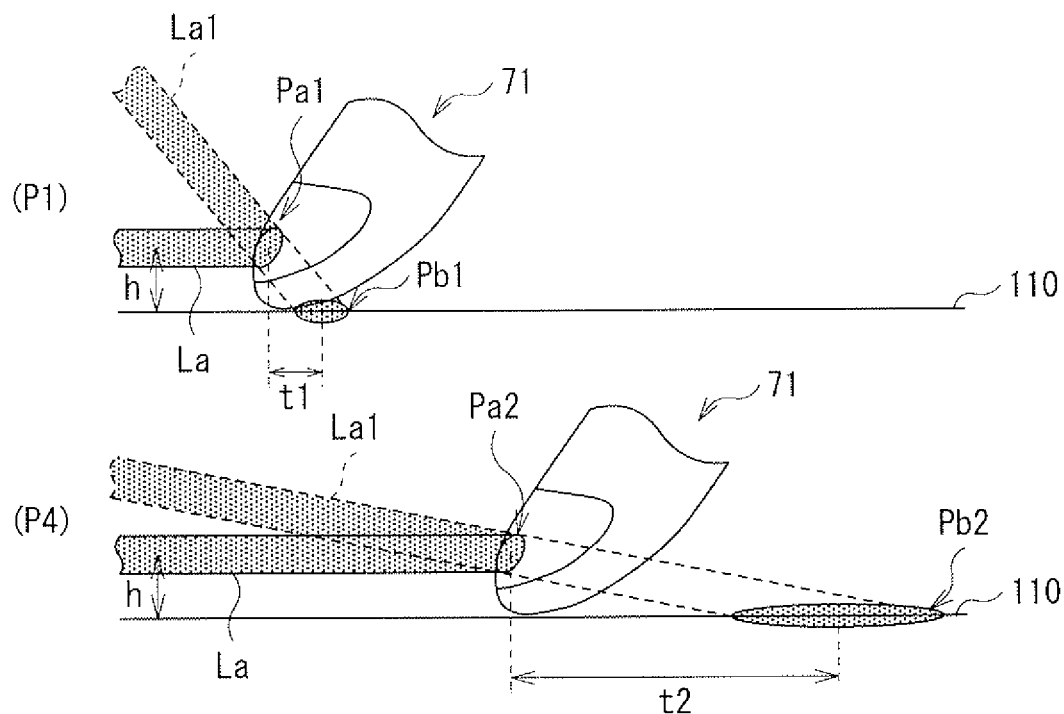
[Fig. 10]
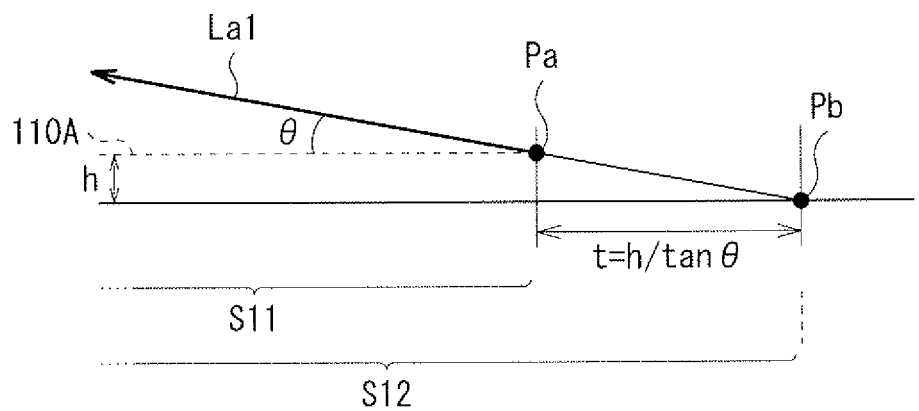

[Fig. 11]
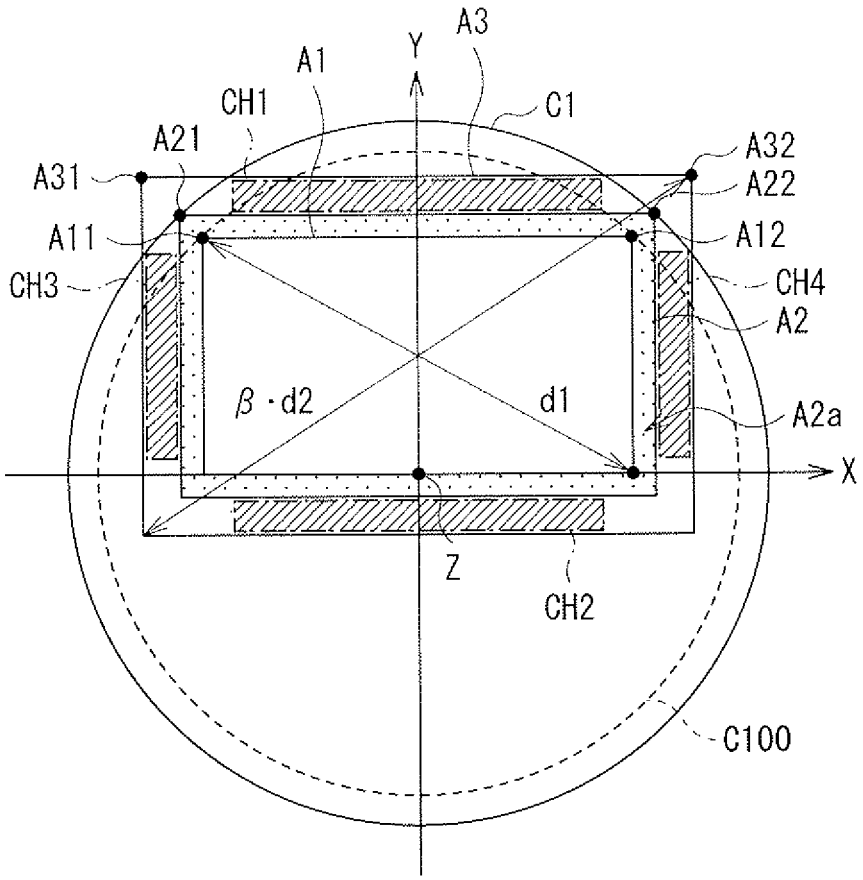
[Fig. 12A]
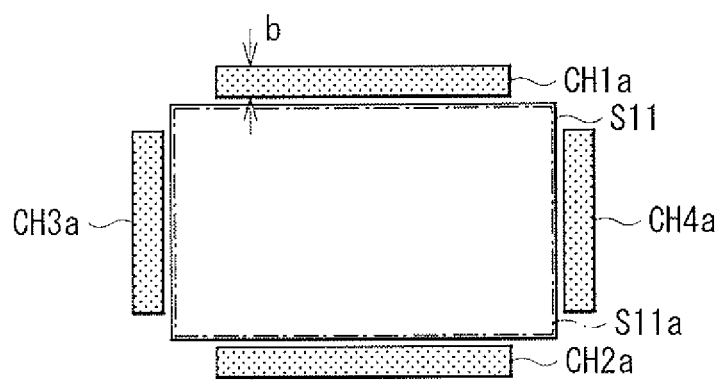
[Fig. 12B]
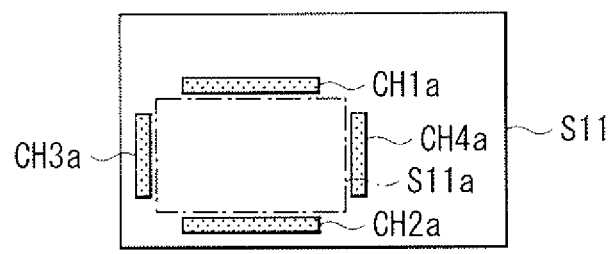

[Fig. 13]
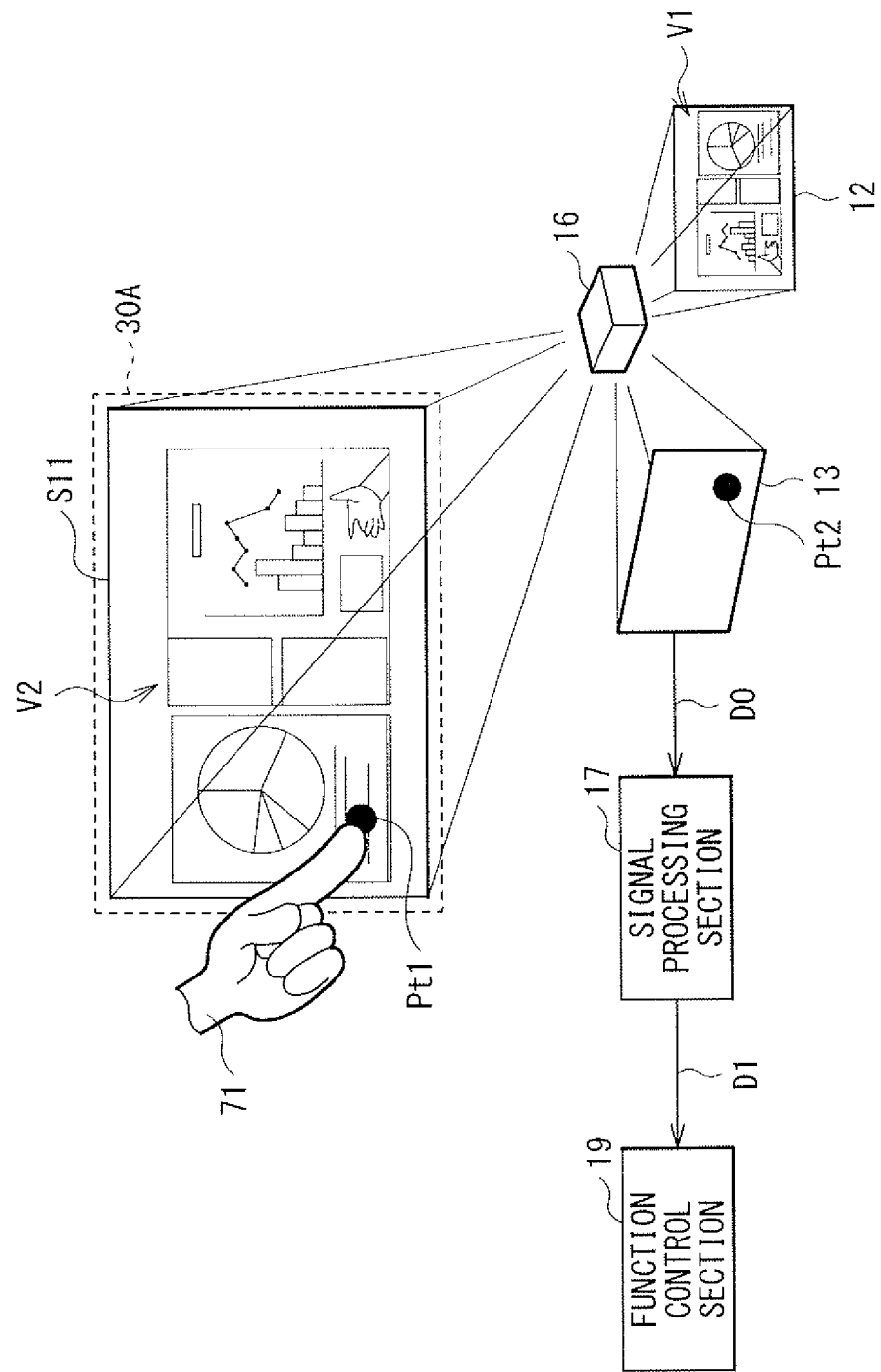

[Fig. 14A]
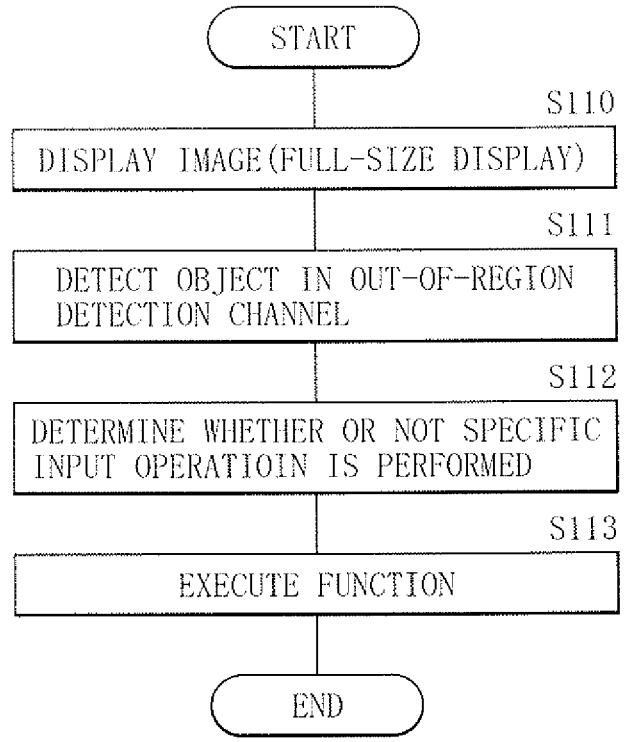
[Fig. 14B]
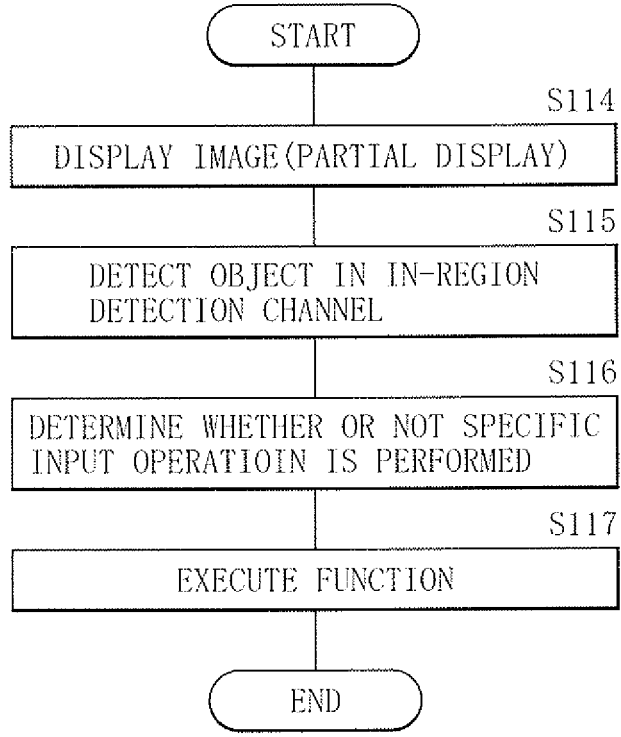

[Fig. 15]
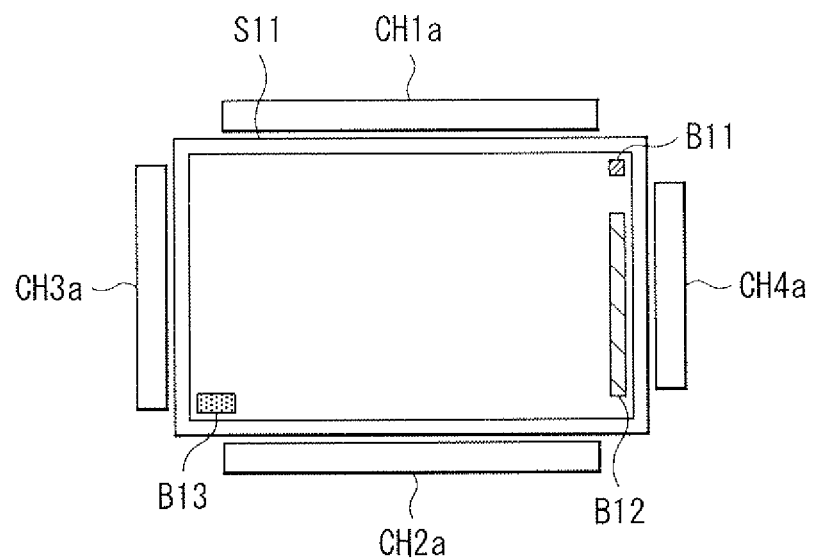

PROJECTION DISPLAY UNIT AND FUNCTION CONTROL METHOD

CROSS REFERENCE TO RELATED APPLICATIONS

This application is a national stage filing under 35 U.S.C. 371 of International Patent Application Serial No. PCT/JP2015/004369, filed Aug. 28, 2015, entitled "PROJECTION DISPLAY UNIT AND FUNCTION CONTROL METHOD", which claims priority under 35 U.S.C. § 119 (a)-(d) or 35 U.S.C. § 365(b) to Japanese application number 2014-182976, filed Sep. 9, 2014, the entire contents of which are incorporated herein by reference in their entireties.

TECHNICAL FIELD

The present disclosure relates to a projection display unit having a detection function and a function control method using this projection display unit.

BACKGROUND ART

In recent years, in smartphones, tablet terminals, and the like, use of a touch panel allows for page-turning and zooming in or out of an image displayed on a screen by an intuitive pointing operation. On the other hand, as a display unit configured to perform display by projecting an image on a screen, a projector (projection display unit) has been long known. There is proposed a technology to add a detection function such as a touch panel to the projector (for example, refer to PTLs 1 and 2).

CITATION LIST

Patent Literature

[PTL 1] Japanese Unexamined Patent Application Publication No. 2007-52218
[PTL 2] Japanese Unexamined Patent Application Publication No. 2003-44839

SUMMARY

Technical Problem

In a projector described in PTL 1, image projection by a projection optical system and capturing of detected light by a detection optical system are performed with use of one projection lens, and a light valve configured to produce an image and an image pickup device configured to receive detected light are disposed in positions optically conjugating with each other. Such a configuration allows for accurate object detection without performing a complicated process such as calibration. An interactive device is achievable with a simple configuration.

In such a projector, it is desirable to achieve a technique of allowing for an improvement in operability by a user possible.

It is desirable to provide a projection display unit and a function control method that allow for an improvement in operability by a user.

Solution to Problem

A projection display unit according to an embodiment of the present disclosure includes: a projection optical system including an illumination section, a projection lens, and a light valve, the light valve configured to modulate illumination light fed from the illumination section, based on an image signal and emit the modulated illumination light to the projection lens; a polarization separation device disposed between the light valve and the projection lens and configured to separate incident light into first and second polarized components and emit the first and second polarized components to different directions from each other; and a detection optical system including an image pickup device, the image pickup device disposed in a position optically conjugating with the light valve. Light, based on invisible light applied along a plane in proximity to a projection surface enters the image pickup device through the projection lens and the polarization separation device, and an input operation is detected in proximity to a projection region on the projection surface, and a specific function is allowed to be executed based on a thus-obtained detection result.

Alternatively or additionally, a projection display unit according to some embodiments may include: a projection optical system including: an illumination section, a projection lens, and a light valve; and a detection optical system including an image pickup device, the image pickup device being disposed in a position optically conjugating with the light valve, wherein: the detection optical system is configured to detect whether an input operation is performed in a peripheral region of a projection region on a projection surface, and in response to detection by the detection optical system in the peripheral region, a specific function is caused to be executed.

In some embodiments, a first rectangular shape may be disposed in a first position at about a focal length of the projection lens or a second position having an optically conjugating relationship with the first position, the first rectangular shape being a planar shape corresponding to an effective region of the light valve, and a second rectangular shape may be disposed such that a central position of the second rectangular shape substantially aligns with a central position of the first rectangular shape, the second rectangular shape being a planar shape corresponding to an effective region of the image pickup device and being larger than the first rectangular shape.

In these embodiments, the projection display unit may be configured to cause a first detection region corresponding to the projection region and a second detection region corresponding to the peripheral region of the projection region to be formable on the projection surface.

In these embodiments, the second detection region may have one or more channel regions or position coordinates, the respective one or more channel regions or position coordinates corresponding to respective input operations.

In these embodiments, at least one of the one or more channel regions may be provided to face each side of four sides of a rectangular shape of the projection region.

In some embodiments, in response to detection of an object by the detection optical system a plurality of times within a predetermined period in one channel region of the plurality of channel regions, the specific function may be caused to be executed.

In these embodiments, in response to continuous detection of an object by the detection optical system within a predetermined period in one channel region of the plurality of channel regions, the specific function may be caused to be executed.

In these embodiments, in response to detection of an object in one channel region of the plurality of channel regions and of an object in another channel region of the plurality of channel regions within a predetermined period by the detection optical system, the specific function may be caused to be executed.

In these embodiments, in response to concurrent detection of objects in two or more different channel regions of the plurality of channel regions by the detection optical system, the specific function may be caused to be executed.

In these embodiments, in response to concurrent detection of objects in one channel region of the plurality of channel regions and a selective region in the first detection region, the specific function may be caused to be executed.

In these embodiments, the first detection region may include one or more channel regions around a selective image display region in the projection area, the respective one or more channel regions corresponding to respective input operations.

In these embodiments, the projection display unit may further include: a polarization separation device disposed between the light valve and the projection lens and configured to: separate incident light into a first polarized component and a second polarized component and emit the first polarized component and the second polarized component to different directions from each other.

In these embodiments, the polarization separation device may comprise a polarizing beam splitter.

In some embodiments, the light valve may comprise a reflective liquid crystal display device.

In these embodiments, the polarization separation device may have a first surface, a second surface, a third surface, and a fourth surface, each of the first surface, the second surface, the third surface, and the fourth surface may serve as a light incident surface or a light emission surface, and the polarization separation device may be configured to emit: from the second surface, a first polarized component of light having entered from the first surface, from the third surface, a second polarized component of the light having entered from the first surface, from the fourth surface, a second polarized component of light having entered from the second surface, and from the third surface, a first polarized component of light having entered from the fourth surface.

In these embodiments, the illumination section may be configured to emit illumination light to the first surface of the polarization separation device, the light valve may be configured to modulate a first polarized component of the illumination light emitted from the second surface of the polarization separation device and emit the modulated light to the second surface of the polarization separation device, and the projection lens may be configured to project light of the modulated light emitted from the fourth surface of the polarization separation device to the projection surface.

In these embodiments, the detection optical system may be configured to: receive light for object detection via a zoom-out optical system through the projection lens, the fourth surface of the polarization separation device, and the third surface of the polarization separation device, and transmit light emitted from the zoom-out optical system to the image pickup device.

In some embodiments, light based on invisible light emitted along a plane may enter the image pickup device through the projection lens and the polarization separation device, the plane being in proximity to the projection surface.

In these embodiments, the invisible light may comprise near-infrared light.

In some embodiments, the projection lens may comprise a short throw lens.

In these embodiments, a light source section configured to emit the invisible light may be provided on a casing of the projection display unit.

In some embodiments, the light valve may be configured to: modulate illumination light fed from the illumination section based on an image signal and emit the modulated illumination light to the projection lens.

A function control method according to an embodiment of the present disclosure includes: determining whether or not a specific input operation is performed in a peripheral region of a projection region, based on an image pickup signal obtained by an optical system, the optical system including a projection lens, a light valve, a polarization separation device, and an image pickup device, the light valve configured to modulate illumination light, based on an image signal and emit the modulated illumination light to the projection lens, the polarization separation device disposed between the light valve and the projection lens, and the image pickup device disposed in a position optically conjugating with the light valve and configured to receive invisible light; and controlling to execute a specific function, based on a thus-obtained determination result.

Alternatively or additionally, a function control method according to some embodiments may include: projecting to a projection region on a projection surface using a projection optical system including an illumination section, a projection lens, and a light valve; detecting whether an input operation is performed in a peripheral region of the projection region on the projection surface using a detection optical system including an image pickup device, the image pickup device being disposed in a position optically conjugating with the light valve; and in response to detecting the input operation performed in the peripheral region, causing execution of a specific function.

In the projection display unit and the function control method according to the embodiments of the present disclosure, the image pickup device is disposed in the position optically conjugating with the light valve, and light, based on invisible light (a part of invisible light reflected by the object) enters the image pickup device through the projection lens and the polarization separation device. A specific input operation in a peripheral region of the projection region is allowed to be detected, based on a thus-obtained image pickup signal, and a specific function is allowed to be executed accordingly.

Advantageous Effects of Invention

In the projection display unit and the function control method according to the embodiments of the present disclosure, the image pickup device is disposed in the position optically conjugating with the light valve, and light, based on the invisible light (a part of invisible light reflected by the object) enters the image pickup device through the projection lens and the polarization separation device; therefore, an image pickup signal, based on the invisible light is allowed to be obtained. An object in a peripheral region of the projection region is allowed to be detected, based on the image pickup signal, and a function, based on a specific input operation is allowed to be executed accordingly. Therefore, an input operation is possible not only in the projection region but also the peripheral region of the projection region, and flexibility of the input operation is enhanced. Thus, an improvement in operability by a user is possible.

It is to be noted that the above description is merely an example of the embodiments of the present disclosure.

Effects of the embodiments of the present disclosure are not limited to effects described here, and may be different from the effects described here or may further include any other effect.

It is to be understood that both the foregoing general description and the following detailed description are exemplary, and are intended to provide further explanation of the technology as claimed.

BRIEF DESCRIPTION OF DRAWINGS

FIG. 1 is a schematic view illustrating an appearance and a usage state of a projection display unit according to an embodiment of the present disclosure.

FIG. 2 is a block diagram illustrating a function configuration of the projection display unit illustrated in FIG. 1.

FIG. 3 is a schematic side view of the state in FIG. 1.

FIG. 4 is a diagram illustrating a configuration example of a near-infrared light source section illustrated in FIG. 1.

FIG. 5A is a perspective view of a first configuration example of a cylinder array lens.

FIG. 5B is a perspective view illustrating a second configuration example of the cylinder array lens.

FIG. 6 is a diagram illustrating a configuration of a main part of the projection display unit illustrated in FIG. 1.

FIG. 7 is a schematic view illustrating a configuration example of a polarization separation device with states of incident light and emitted light.

FIG. 8A is a schematic view illustrating capturing of detected light.

FIG. 8B is a schematic view for describing a difference in capturing angle between detected positions.

FIG. 9 is a schematic view for describing a difference between a reflection point and a virtual light emission point of detected light.

FIG. 10 is a schematic view for describing a relationship between the difference between the reflection point and the virtual light emission point and the capturing angle.

FIG. 11 is a schematic view illustrating an image circle of a projection lens with a light valve size and an image pickup device size.

FIG. 12A is a schematic view for describing a case where an out-of-region detection channel is used (in a case of full-size display).

FIG. 12B is a schematic view for describing a case where an in-region detection channel is used (in a case of partial display).

FIG. 13 is a diagram schematically illustrating a concept of image display and object detection of the projection display unit illustrated in FIG. 1.

FIG. 14A is a flow chart illustrating a procedure of function control in the case where the out-of-region detection channel is used (in the case of full-size display).

FIG. 14B is a flow chart illustrating a procedure of function control in the case where the in-region detection channel is used (in the case of partial display).

FIG. 15 is a schematic view for describing a function control example.

DESCRIPTION OF EMBODIMENTS

Some embodiments of the present disclosure will be described in detail below referring to the accompanying drawings. It is to be noted that description will be given in the following order.

x Embodiment (An example of a projection display unit in which channel regions for detection of a specific input operation are provided in and out of a projection region)
1. Configuration
2. Action and Effects
(Embodiment)
(Configuration)

FIG. 1 illustrates an appearance and a usage state of a projection display unit (a projection display unit 1) according to an embodiment of the present disclosure. FIG. 2 illustrates a function configuration of the projection display unit 1. The projection display unit 1 may be, for example, a projector (a so-called ultra short throw projector) configured to project an image in proximity thereto while being placed on a flat surface such as a top of a table (or while being mounted on a wall surface or the like). This projection display unit 1 also has a function of actively performing object detection in addition to image display. As will be described in detail later, as illustrated in FIG. 1, a user is allowed to perform a predetermined input operation by performing some operation such as touching a displayed image with his finger (an indicator 71) in a projection region S11 (a projectable region corresponding to a light valve size) where an image is projected.

As illustrated in FIG. 2, the projection display unit 1 includes an illumination section 11, a light valve 2, an image pickup device 13, a zoom-out optical system 14, a polarization separation device 15, a projection lens 16, a signal processing section 17, and a function control section 19. For example, the illumination section 11, the light valve 12, and the projection lens 16 may configure a projection optical system 10A, and, for example, the image pickup device 13 and the zoom-out optical system 14 may configure a detection optical system 10B. It is to be noted that, for example, driving of the illumination section 11, the light valve 12, the image pickup device 13, the signal processing section 17, and the function control section 19 may be controlled by a system control section (not illustrated) at a predetermined timing.

A near-infrared light source section 40 is provided on a casing of the projection display unit 1. The near-infrared light source section 40 is a light source section configured to emit near-infrared light (NIR) as invisible light for detection, and is configured to emit near-infrared light along a plane in proximity to a projection surface 110. In other words, in the near-infrared light source section 40, a near-infrared light barrier film (a detection light plane 110A) is formed in proximity to the projection surface 110 to cover the projection region S11. The detection light plane 110A is formed in a plane at a predetermined height h, which is different from a height of an optical axis passing through the projection lens 16, from the projection surface 1110 (refer to FIG. 3).

As an example, the detection light plane 110A may be formed, for example, with a thickness (a width in a height direction) of about 2 mm to about 3 mm in a position at the height h of about several mm to about several tens of mm to cover the projection region S11 in an in-plane direction. In general, the projection surface 110 is flat; therefore, as long as a shielding object or the indicator 71 such as a finger and a pointer is not present, the detection light plane 110A is not blocked. In other words, no image appears on the image pickup device 13 that monitors the projection surface 110. When an operation of moving a finger or the like close to the projection surface 110 or touching the projection surface 110 with the finger or the like is performed in this state, near-infrared light of the detection light plane 110A is blocked by the finger or the like, and is diffused and reflected at a point where the near-infrared light of the detection light plane 110 is blocked. Light reflected by the finger or the like radiates in all directions, and a part of the reflected light is captured in an aperture of the projection lens 16. The part of the reflected light reaches the image pickup device 13 through the projection lens 16 and the polarization separation device 15. At this time, the light valve 12 configured to produce an image, and the image pickup device 13 are disposed in positions optically conjugated with each other; therefore, a bright spot diffusion point generated in a dot shape on the projection surface 110 forms an image on the image pickup device 13, and forms an image in a corresponding position on the projected image. Therefore, position detection of an object is possible. In a case of the ultra short throw projector, projected light passes in proximity to the projection surface 110, and a part of a body of a user who operates the projector is less likely to block the projected light; therefore, there is an advantage that a screen is easily seen when the user operates the projector.

It is to be noted that the near-infrared light source section 40 may be provided, for example, on a bottom of the casing of the projection display unit 1, as illustrated; however, the near-infrared light source section 40 may be or may not be disposed adjacent to the projection display unit 1. As long as the detection light plane 110A is allowed to be formed to cover the projection region S11, the detection light source 110 may be disposed in a position away from the projection display unit 1. Alternatively, the near-infrared light source section 40 may be disposed inside the casing (an enclosure) of the projection display unit 1. In this embodiment, the near-infrared light source section 40 is allowed to be disposed at a height relatively away from the projection surface 110 by optical design that will be described later, and is easily bundled integrally with the projection display unit 1 accordingly.

When the object (the indicator 71) comes into contact with or comes close to the projection surface 110, the detection light plane 110A allows near-infrared light to be reflected (diffused and reflected) by the indicator 71, and then allows a part of the reflected light to be captured in the projection display unit 1 as detected light.

As illustrated in FIG. 4, the near-infrared light source section 40 may include, for example, a near-infrared laser 42, a collimator lens 43, and a cylinder array lens 44. The detection light plane 110A is formed of near-infrared light 41 emitted from the cylinder array lens 44. As illustrated in FIG. 5A, the cylinder array lens 44 is configured of an array of a plurality of convex cylinder lenses. The cylinder array lens 44 is disposed to allow a generatrix 44A of each cylinder lens to face a plane perpendicular to the projection surface 110. It is to be noted that, instead of the convex cylinder array lens 44, a cylinder array lens 45 configured of an array of a plurality of concave cylinder lenses may be used.

The illumination section 11 is configured to emit illumination light L1 toward the light valve 12 through the polarization separation device 15. As long as the illumination section 11 emits visible light as the illumination light L1, the illumination section 11 is not specifically limited. The illumination section 11 may include, for example, a blue laser, a green laser, and a red laser (all of which are not illustrated).

Referring to FIG. 2 and FIGS. 6 to 12B, a configuration of a main part of the projection display unit 1 will be described below.

Projection Optical System 10A

The light valve 12 may be a reflective liquid crystal device such as LCOS (Liquid Crystal On Silicon). The light valve 12 may be configured to modulate a first polarized component (for example, an s-polarized component Ls1 that will be described later) included in the illumination light L1, based on image data. A polarization state of light modulated by the light valve 12 is rotated, and thus the light is converted into a second polarized component (for example, a p-polarized component that will be described alter). This modulated light is emitted toward the projection lens 16 through the polarization separation device 15. It is to be noted that, in the light valve 12, black display is allowed to be performed by returning incident light (the s-polarized component Ls1) to the polarization separation device 15 without changing the polarization state thereof. A planar shape of an effective region (a rectangular shape A1 that will be described later) of the light valve 12 may be, for example, rectangular.

The projection lens 16 is configured to project, onto the projection surface 110, light (image light L2) having entered from the light valve 12 through the polarization separation device 15. The projection lens 16 may be, for example, an ultra short throw lens with a throw ratio of about 0.38 or less. Herein, the throw ratio is represented by L/H, where a distance from the projection lens 16 to the projection surface 110 is L and a width of the projection region S11 is H. As illustrated in FIGS. 2 and 6, detected light (near-infrared light La1) enters this projection lens 16 from an opposite direction to a travel direction of modulated light. Thus, in this embodiment, the detected light is captured through the projection lens 16 of the projection optical system 10A to be guided to the detection optical system 10B. Moreover, as will be described later, a diameter of an image circle by the projection lens 16 is set within a predetermined range.

Polarization Separation Device 15

The polarization separation device 15 is configured to separate incident light into the first polarized component (for example, an s-polarized component) and the second polarized component (for example, a p-polarized component) and emit the first and second polarized components in different directions from each other. This polarization separation device 15 may be configured of, for example, a polarizing beam splitter (PBS), and may be configured to selectively reflect the first polarized component (reflect the first polarized component on a polarization separation surface 150) and allow the second polarized component to selectively pass therethrough (pass through the polarization separation surface 150). In this embodiment, description is given of a case where the polarizing beam splitter is used as the polarization separation device 15 as an example; however, the polarization separation device 15 is not limited thereto, and may be configured of a wire grid. In this case, the wire grid has different characteristics from those of the polarizing beam splitter, and is allowed to selectively reflect the p-polarized component as the first polarized component of incident light and allow the s-polarized component of the incident light as the second polarized component to selectively pass therethrough.

As illustrated in FIG. 6, this polarization separation device 15 may have four optical surfaces (a first surface 15A, a second surface 15B, a third surface 15C, and a fourth surface 15D) and the polarization separation surface 150. The first surface 15A and the third surface 15C are disposed to face each other in one axis direction (a horizontal direction in the diagram), and the second surface 15B and the fourth surface 15D are disposed to face each other in one axis direction (a vertical direction in the diagram). In such a configuration, the illumination light L1 enters the first surface 15A, and the light valve 12 is disposed to face the second surface 15B. The detection optical system 10B is disposed to face the third surface 15C, and the projection lens 15 is disposed to face the fourth surface 15D.

FIG. 7 illustrates a configuration example of the polarization separation device 15. The polarization separation device 15 reflects the first polarization component (the s-polarized component Ls1) of the illumination light L1 having entered from the first surface 15A and emits the first polarization component from the second surface 15B. On the other hand, the polarization separation device 15 emits, from the third surface 15C, the second polarized component (a p-polarized component Lp1) of the illumination light L1. Moreover, the polarization separation device 15 emits, from the fourth surface 15D, the second polarized component (a p-polarized component Lp2) of light having entered from the second surface 15B (modulated light from the light valve 12). Therefore, an image is projected by the projection optical system 10A. On the other hand, the polarization separation device 15 reflects the first polarized component (an s-polarized component Ls3) of light (the near-infrared light La1) having entered from the fourth surface 15D, and emits the first polarized component from the third surface 15C. Light, based on this s-polarized component Ls3 is received by the image pickup device 13. Thus, an image pickup signal D0 is obtained by the image pickup device 13.

Detection Optical System 10B

The image pickup device 13 is disposed in a position optically conjugating with the light valve 12. More specifically, in a case where the light valve 12 is a reflective liquid crystal device, a display surface (a liquid crystal surface) where an image is produced of the light valve 12 and an image pickup surface of the image pickup device 13 are disposed to have an optically conjugating relationship therebetween. The image pickup device 13 may be configured of a solid-state image pickup device such as a CMOS (Complementary Metal-Oxide Semiconductor) or a CCD (Charge Coupled Device), and the planar shape of the effective region (a rectangular shape A3 that will be described later) may be, for example, rectangular. In this embodiment, as will be described in detail later, the size of the image pickup device 13 is designed to allow a peripheral region of the projection region S11 to also serve as a light reception target.

As illustrated in FIG. 6, an example of the detection optical system 10B including this image pickup device 13 may be a detection optical system in which a visible light cut filter 17A, a bandpass filter 17B, a zoom-out optical system 14 (relay lens groups 14A and 14B), a polarizer 18, and the image pickup device 13 are arranged in order from a conjugate plane 50.

The visible light cut filter 17A is configured to reduce a visible light component of incident light. When this visible light cut filter 17A is provided, even if the polarizing beam splitter is used as the polarization separation device 15, a large amount of the illumination light L1 having entered the image pickup device 13 is allowed to be cut without turning off a light source of the illumination section 11. Therefore, nearly only detected light is allowed to enter the image pickup device 13, and an S/N ratio is allowed to be increased, thereby enhancing detection accuracy. It is to be noted that, although one visible light cut filter 17A is provided in this case, the number of visible light cut filters is not limited to one, and may be two or more. Moreover, although the visible light cut filter 17A is disposed in a position between the conjugate plane 50 and the zoom-out optical system 14 in this case, the visible light cut filter 17A may be disposed in another position, for example, between the zoom-out optical system 14 and the image pickup device 13.

The bandpass filter 17B is configured to allow a specific wavelength (near-infrared light) to selectively pass therethrough and to reduce other wavelengths.

The polarizer 18 is an optical member configured to reduce the second polarized component included in the illumination light L1. In this case, the polarization separation device 15 as described above allows the second polarized component (for example, the p-polarized component) of the illumination light L1 to pass therethrough; therefore, this p-polarized component may enter the detection optical system 10B, thereby influencing an S/N ratio of an image pickup signal obtained in the image pickup device 13. As with this embodiment, when the polarizer 18 is provided, the second polarized component (for example, the p-polarized component) included in the illumination light L1 is allowed to be cut, thereby enhancing the S/N ratio. It is to be noted that the position of the polarizer 18 is not limited to the illustrated position between the zoom-out optical system 14 and the image pickup device 13, and the polarizer 18 may be disposed in another position, for example, between the conjugate plane 50 and the zoom-out optical system 14.

The zoom-out optical system 14 may be configured of one or a plurality of relay lens groups (two relay lens groups 14A and 14B in this case). Each of the relay lens groups 14A and 14B has positive power, and is configured of one or more lenses. A focal length fi of the relay lens group 14B is set to be smaller than a focal length fb of the relay lens group 14A. For example, on condition that 2 fi is equal to fb, the relay lens group 14A may be disposed in a position at a distance equal to the focal length fb from the conjugate plane 50 of the light valve 12, the relay lens group 14B may be disposed in a position at a distance of (fb+fi) from the position of the relay lens group 14A, and the image pickup device 13 may be disposed in a position at a distance equal to the focal length fi from the relay lens 14B. Such arrangement of the relay lens groups 14A and 14B is equivalent to a case where the image pickup device 13 is disposed on the conjugate plane 50 while achieving the zoom-out optical system. In other words, while a position relationship conjugating with the light valve 12 is maintained, a further reduction in the size of the image pickup device 13 is possible.

Object detection with use of such a zoom-out optical system 14 is advantageous for cost reduction. The cost of the image pickup device 13 is greatly influenced by the size of the image pickup device 13. Cost of configuring the projector is weighted heavily toward the light valve 12 and the image pickup device 13 as semiconductor components; therefore, a cost advantage by a size reduction in such components is large. Moreover, there is an advantage that flexibility of arrangement is enhanced by extending a conjugate point by a relay optical system. For example, when a distance between components is produced, a bending optical system configured of a reflective mirror may be achieved between the components.

Channel Setting for Out-of-Region Detection

In this embodiment, a region (a second detection region) where object detection is possible is formed in a peripheral region of the projection region S11 on the projection surface. A channel region (channel regions CH1a to Ch4a that will be described later and the like) corresponding to a specific input operation is allocated to this second detection region.

In other words, object detection is possible in the peripheral region of the projection region S11 (hereinafter referred to as "out of the region"), and when the specific input operation is performed out of the region, a function corresponding to the input operation is executed. It is to be noted that the specific input operation may be allocated to not the channel region but position coordinates. A specific configuration configured to achieve the input operation by such out-of-region detection will be described below.

First, a summary of capturing of detected light will be described. As schematically illustrated in FIG. 8A, when an indicator 71 such as a finger comes in contact with or comes close to the projection surface 110, near-infrared light La in the detection light plane 110A formed in proximity to the projection surface 110 strikes the indicator 71 to be diffused and reflected in all directions. After a part (near-infrared light La1) of the diffused and reflected light (scattering light) is condensed by the projection lens 16, the part of the diffused and reflected light is taken by the exit pupil E1 in the detection optical system 10B.

Now, the near-infrared light La1 captured by the detection optical system 10B through the projection lens 16 in the above-described manner will be described in detail below. As illustrated in FIG. 8B, in a case where a position of an object on the projection surface 110 is detected, a capturing angle of the near-infrared light La1 (an angle "theta" between the near-infrared light la1 entering the exit pupil E1 of the detection optical system 10B and the projection surface 110) differs depending on the detected position. More specifically, when viewed from a position P1 closest to the exit pupil E1, the exit pupil E1 is located above the position P1; therefore, the capturing angle "theta" is at the maximum. Next, as a distance from the exit pupil E1 is gradually increased in order of positions P2 and P3, the capturing angle "theta" is gradually reduced. A position P4 is farthest from the exit pupil E1, and at the position P4, the capturing angle "theta" is at the minimum.

As described above, it is found that the distance to the exit pupil E1 or the capturing angle "theta" is changed by a difference in the detected position. Values of these parameters differ depending on a size of the projection region S11, ultra short throw lens design, or the like; however, a relative magnitude relationship of the capturing angle "theta" by the above-described difference in the detected position is not changed; therefore, the position of the indicator 71 is allowed to be determined with use of this relationship.

Next, the near-infrared light La1 entering the exit pupil E1 will be studied in more detail. FIG. 9 schematically illustrates a state of reflection around the indicator 71. It is to be noted that an upper diagram in FIG. 9 illustrates reflection at the position P1 and a lower diagram in FIG. 9 illustrates reflection at the position P4. As illustrated in FIG. 9, the near-infrared light La in the detection light surface 110 strikes the indicator 71 and is reflected by the indicator 71, and at this time, the following phenomenon occurs. In this embodiment, the near-infrared light La1 when viewed from the exit pupil E1 (the projection lens 16) seems to be emitted from not reflection points (actual irradiation points) Pa1 and Pa2 where the near-infrared light La1 actually strikes the indicator 71 but points (virtual light emission points Pb1 and Pb2) on the projection surface 110 located at a distance corresponding to an oblique component by a height h. In other words, a difference t1 is made between the reflection point Pa1 corresponding to the actual position of the indicator 71 and the virtual light emission point Pb1. Likewise, a difference is made between the reflection point Pa2 and the virtual light emission point Pb2. Moreover, this difference (an extension in the detected position) is influenced by the detected position, i.e., the capturing angle "theta", and the smaller the capturing angle "theta" is, the more the difference is influenced. In this case, since the capturing angle "theta" at the position P4 is at the minimum, the difference t2 at the position P2 has a maximum value. It is to be noted that, since the capturing angle "theta" at the position P1 is at the maximum, the difference t1 at the position P1 has a minimum value.

Therefore, to make object detection in the entire projection region S11 possible, as illustrated in FIG. 10, the size of the image pickup device 13, the diameter of an image circle (an image circle C1 that will be described later), and the like are so designed as to allow an region (an region S12) in consideration of a width t corresponding to the above-described difference from an end of the projection region S11 to serve as a light reception target. It is to be noted that the width t is allowed to be represented with use of the height h of the detection light plane 110A and the capturing angle "theta" (t=h/tan "theta").

FIG. 11 illustrates an example of a positional relationship among the image circle C1, a planar shape (a rectangular shape A1) corresponding to the effective region of the light valve 12, a planar shape (a rectangular shape A3) corresponding to the effective region of the image pickup device 13, and the channel regions (the channel regions CH1 to CH4). More specifically, these rectangular shapes A1 and A3 correspond to planar shapes at about a focal length of the projection lens. In general, "image circle" represents a circular range where light having passed through a lens forms an image. In a projection system such as a projector, the effective region of the light valve is designed to be secured at a position where the light valve is disposed. In other words, a region where a light beam emitted from the effective region of the light valve passes is designed to be secured in the projection lens. On the other hand, in a case of an image pickup system such as a camera, a region where a light beam entering the effective region of the image pickup device passes is designed to be secured in an image pickup lens. In this embodiment, image projection and capturing of detected light (near-infrared light) are performed by one projection lens 16; therefore, the image circle (the image circle C1) may be desirably designed to secure a light beam passing through a portion with the highest image height.

Moreover, in this case, the ultra short throw projector is used; therefore, the image circle C1 is designed to secure a region where a light beam of which an image height is largely shifted (offset) along one direction (a Y direction in FIG. 11 in this case) passes. In this case, in a case of a projector configured to only project an image, an image circle (an image circle C100) is designed to circumscribe some apexes of the rectangular shape A1 of the light valve 12. More specifically, the image circle C100 is designed to be in contact with a pair of apexes A11 and A12 sharing one long side in the rectangular shape A1. The image circle C100 is designed to circumscribe the rectangular shape A1, because since the diameter of the image circle is extremely large and the size of the projection lens is enormous, in terms of maintenance of characteristics and cost, it may be desirable that the diameter of the image circle be minimized.

However, in a case where, as with this embodiment, the projection lens 16 is shared between the projection optical system 10A and the detection optical system 10B, since there is a difference (an extension) between the reflection point and the virtual light emission point, it may be desirable to design the image circle C1 in consideration of this difference. More specifically, it may be desirable that the image circle C1 contain the rectangular shape A2 including a cover region A2a in consideration of the above-described difference, because object detection is possible even in a corner section (an apex portion) of the projection region S11.

To secure a detection region in a peripheral portion of the projection region S11, the rectangular shape A3 of the image pickup device 13 is designed to be larger in size than the rectangular shape A1 of the light valve 12. In other words, a diagonal size of the image pickup device 13 is configured to satisfy the following conditional expression (1), where d1 is a diagonal size of the light valve 12, d2 is a diagonal size of the image pickup device 13, "beta" is an optical magnification of the detection optical system (where "beta" is larger than 1 in the zoom-out optical system, "beta" is smaller than 1 in an zoom-in optical system, and "beta" is equal to 1 in an equal magnification optical system). However, in this embodiment, since the detection optical system 10B includes the zoom-out optical system, this "beta" is a zoom-out magnification of the zoom-out optical system 14, and "beta" is larger than 1. It is to be noted that the diagonal size d1 is a diagonal size of the effective region of the light valve 12, and the diagonal size d2 is a diagonal size of the effective region of the image pickup device 13. Therefore, the channel regions CH1 to CH4 for out-of-region detection are allowed to be allocated to peripheral regions of the rectangular shape A1 of the light valve 12. In other words, the image circle C1 has free regions around the rectangular shapes A1 and A2, and the channel regions CH1 to CH4 are allowed to be allocated to the free regions. Moreover, apexes A31 and A32 of the rectangular shape A3 of the image pickup device 13 may be configured to be in contact with the image circle C1, or apexes A31 and A32 of the rectangular shape A3 may be configured to be located outside of an outer circumference of the image circle C1.

$$d1 \text{ is smaller than "beta"}*d2 \quad (1)$$

The respective channel regions CH1 to CH4 may be provided to face, for example, respective sides of the rectangular shape A1, and each of the channel regions CH1 to CH4 may be a rectangular region having a longitudinal direction along an outer perimeter of the rectangular shape A1. However, this layout is merely an example. It may be only necessary that the channel regions CH1 to CH4 are allocated to regions located outside the outer perimeter of the rectangular shape A1 and inside the outer circumference of the image circle C1, and the number of the channel regions, the shapes, positions, and the like of the channel regions are not specifically limited. Moreover, a plurality of channel regions may be allocated to one side of the rectangular shape A1 to increase functions that are to be executed. On the contrary, only one channel region may be provided around the rectangular shape A1. In this case, a description is given of a case where the respective channel regions CH1 to CH4 are allocated to face respective four sides of the rectangular shape A1 as an example.

FIG. 12A illustrates an example of a layout on the projection surface 110, based on such channel setting. Thus, channel regions CH1a to CH4a are formed in peripheral regions of an image display region S11a corresponding to the above-described channel regions CH1 to CH4 in the projection surface 110. In these channel regions CH1a to CH4a, a width d may be desirably about 10 mm or more in a case where it is assumed that an operation is performed with use of a finger or a hand. Moreover, the width d may be desirably about 30 mm or more, and more desirably about 50 mm or more. It is to be noted that a case where display (full-screen display, full-size display) in which the projection region S11 is equal in size to the image display region S11a is performed is illustrated.

Input operations for execution of various functions are allowed to be set with use of these channel regions CH1 to CH4 (CH1a to CH4a). Functions that are to be executed are not specifically limited; however, the functions may be desirably functions unaccompanied by movement of an image. Examples of the functions may include turning on/off of the projection display unit 1, volume adjustment, screen size adjustment, page-turning, scrolling, open/close of a window screen, going back/forward, and the like. It is to be noted that a function of directly moving a displayed image (for example, flick, zooming in and out, rotation, and the like) may be desirably performed on the projected image as usual.

The functions that are to be executed may include various functions in a case where it is desired to perform an operation without interfering with a displayed image, music, or any other screen information.

As input operations for execution of the above-described functions, for example, various gestures with use of one or more of the channel regions CH1a to CH4a may be set. Examples of the input operations may include an operation of touching one of the channel regions CH1a to CH4a with a finger (the indicator 71) a plurality of times within a predetermined period (for example, tapping twice), an operation of continuously placing a finger or the like in one of the channel regions CH1a to CH4a within a predetermined period (for example, press-and-hold), an operation of touching one channel region of the channel regions CH1a to CH4a and then touching another channel region within a predetermined period, and an operation of concurrently touching two or more different channel regions of the channel regions CH1a to CH4a. Alternatively, a combination of such out-of-region detection and normal detection in the projection region S11 (hereinafter referred to as "in-region detection") may be set. An example of the combination may be an operation of concurrently touching one channel region of the channel regions CH1a to CH4a and a selective region in the projection region S11.

Thus, while the plurality of channel regions CH1a to CH4a are provided, a plurality of times of the touch operation or a touch operation at a plurality of points may be desirably set as an input operation, because a wrong operation (an operation that is not intended by a user) is allowed to be prevented. In setting in which a function is executed by a touch operation only once or only at one point, the function may be executed even in a case where the user touches a channel region by mistake, thereby easily causing a malfunction.

Specific examples of the above-described input operations and functions may be described below. The examples may include a case where a function of turning on or off the projection display unit 1 is executed by allowing a detection signal to pass through the channel regions CH1a and CH2a within a predetermined period, a case where a function of turning down volume is executed by touching the channel region CH4 while touching the channel region CH3, and, conversely, a case where a function of turning up volume is executed by touching the channel region CH3 while touching the channel region CH4. Other examples of the input operations and the functions will be described later.

Moreover, a case where the entire projection region S11 serves as an image display region S11a is exemplified; however, a part of the projection region S11 may serve as the image display region S11a (an image is displayed or zoomed out in the part of the projection region S11). In such a case (in partial display), for example, as illustrated in FIG. 12B, channel regions CH1b to CH4b are formed in peripheral regions of the image display region S11a in the projection region S11 of the projection surface 110. Moreover, a ratio of zooming in or out may be maintained by an operation of zooming in or out.

The signal processing section 17 may be configured to detect, for example, a position of a characteristic point of the indicator (object) 71 such as a human finger or a pointer corresponding to coordinates in the projection region S11 on the projection surface 110, based on an image pickup signal by the image pickup device 13. As an example of the characteristic point, a shape of a tip of the human finger, a barycenter of the finger, a barycenter of a hand, and the like may be used. Moreover, a light reception amount in the image pickup device 13 differs by a difference in reflectivity between a finger and a stylus. Therefore, position detection may be performed only in a case where the indicator 71 is a specific one (for example, a finger) by setting of a threshold value. The signal processing section 17 determines, based on a thus-obtained object detection result, whether or not a specific input operation corresponding to the above-described function is performed. Moreover, as illustrated in FIG. 2, a thus-obtained determination result D1 is outputted to the function control section 19.

The function control section 19 is configured to perform control to execute a predetermined function, based on the determination result D1.

Actions and Functions

In the projection display unit 1, as illustrated in FIG. 13, image information V1 formed on the light valve 12 is projected onto the projection surface 110 such as a top of a table by the projection lens 16 to be zoomed in as a projected image V2. On the other hand, the projection display unit 1 may detect a position of an object on the projection surface 110, for example, a position Pt1 of the characteristic point of the indicator (object) 71 such as a human finger or a pointer with use of an image pickup signal D0 obtained from the image pickup device 13.

In this case, in this embodiment, the projection lens 16 is shared between the projection optical system 10A and the detection optical system 10B, and the image pickup device 13 is disposed in a position optically conjugating with the light valve 12. Therefore, object detection is possible in a region, serving as a detection region (a first detection region), that is substantially the same as the projection region S11a. Moreover, by such an optically conjugating positional relationship, the position Pt1 of the characteristic point of the indicator 71 on the projection surface 110 is allowed to be monitored through the projection lens 16 while being superimposed on the projected image V2. Moreover, for example, in the signal processing section 17, image processing may be performed on a shape of the indicator 71 to detect coordinates of the position Pt1 of the characteristic point of the indicator 71, thereby making a pointing operation on the projected image V2 possible. At this time, an arbitrary coordinate position in the projection region S11 corresponds to a coordinate position in the detection region on a one-to-one basis; therefore, coordinates of a detected position Pt2 on the image pickup device 13 correspond to coordinates of the position Pt1 of the characteristic point of the indicator 71. In other words, without performing complicated signal processing such as calibration, the object is allowed to be detected by associating a position in the projection region S11 and a position in the detection region with each other. It is to be noted that the number of the indicators 71 may be two or more, and, for example, coordinates of tips of fingers of both hands may be detected. An intuitive operation as if a touch panel was built in the projected image V2 of the projector is possible with use of the detected position of the characteristic point of the indicator 71.

Moreover, as illustrated in FIG. 11, when the rectangular shape A3 of the image pickup device 13 is larger than the rectangular shape A1 of the light valve 12, and the diameter of the image circle C1 is optimized, the object is easily detected even in a local region such as a corner section of the projection region S11, and object detection is possible in almost the entire projection region S11. Moreover, the rectangular shape A3 of the image pickup device 13 is designed to allow the apexes A31 and A32 thereof to be in contact with the image circle C1 or partially protrude from the image circle C1. Therefore, an input operation (an input operation by a gesture) in a peripheral region of the image display region S11a (for example, the projection region S11) is allowed to be performed. Then, a function corresponding to this input operation is executed.

A flow of a function control operation, based on the above-described object detection and the above-described input operation is illustrated in FIG. 14A. For example, in a case where the image display region S11a is equivalent to the projection region S11 (in a case of full-size display illustrated in FIG. 12A), first, an image is displayed in full size on the projection region S11 of the projection surface 110 (step S110). After that, in the peripheral regions (the channel regions CH1a to CH4a) of the image display region S11a (the projection region S11), an object (the indicator 71) is detected (step S111). Whether or not a specific input operation is performed is determined, based on a thus-obtained object detection result (step S112). Then, a function corresponding to the input operation is executed, based on a thus-obtained determination result (in a case where the specific input operation is detected) (step S113).

Moreover, a flow of a function control operation in a case where the image display region S11a is in a part of the projection region S11 (in the partial display illustrated in FIG. 12B) is illustrated in FIG. 14B. In a case of partial display, first, an image is displayed on the part of the projection area S11 of the projection surface 110. After that, an object (the indicator 71) is detected in peripheral regions (the channel regions CH1b to CH4b) of the image display region S11a (step S115). Whether or not a specific input operation is performed is determined, based on a thus-obtained object detection result (step S116). Then, a function corresponding to the input operation is executed, based on a thus-obtained determination result (in a case where the specific input operation is detected) (step S117).

Examples of the input operation using the channel regions CH1a to CH4a (and also the channel regions CH1b to CH4b) and a function executed by the input operation will be described below.

Function Control Example 1

An operation in relatively fine narrow parts provided in peripheral regions and corner sections such as a start button, a close button, and a vertical scroll bar of a screen is performed with use of the channel regions CH1a to CH4a allocated to regions around the parts. A schematic view of the function control example 1 is illustrated in FIG. 15. Compared to a case where an operation is performed by directly touching a narrow operation part (such as a button or a scroll) B11, B12, B13, or the like in the screen, the operation is more easily performed by touching a selective region (a region in proximity to any of the operation parts B11, B12, and B13) of the channel regions CH1a to CH4a, and a touch operation does not interfere with screen information.

Function Control Example 2

A function is executed only in a case where a predetermined region of the channel region CH1a and CH4a is also touched concurrently with the above-described input operation. For example, in a case where an operation of touching the channel region CH4a (or a part thereof) while touching the channel region CH3a (or a part thereof) is performed, a function such as a function of closing a window screen is executed. Therefore, a malfunction of the function is allowed to be prevented.

Function Control Example 3

An input operation in a case where it is not desired to interfere with an image, music, or any other screen information by a touch operation is performed out of the region to execute a function, for example, song forward, seek, and volume adjustment.

Function Control Example 4

A gesture of moving a position (a projection position) of the image display region is performed out of the region (in a peripheral region of the projection region S11 or the image display region S11a) to adjust the projection position. For example, in a case where a book, a cup, or the like is placed on a desk, the projection surface 110 is not a flat surface, and has irregularities. In a case where an object causing such irregularities is placed, or the like, a function of shifting the image display region S11a to a flat surface to avoid the irregularities is executed by an input operation out of the region.

Function Control Example 5

A function of zooming in or out the display screen size is executed by concurrently seeking a plurality of selective regions (for example, two sides or two corners) out of the region. Since detection of an image pointing operation is allocated to the projection region S11, a detection error or a malfunction is allowed to be prevented by an operation out of the region and a concurrent operation at a plurality of points.

Function Control Example 6

A function of detecting another electronic apparatus such as a smartphone or a tablet terminal placed in proximity to the projection region S11, developing, for example, a page icon on a standby screen on the projection region S11, and displaying an image of the electronic apparatus on a screen larger than the electronic apparatus is executed.

Function Control Example 7

A function of returning to a previous screen is executed by tapping a selective region out of the region twice. Tapping in the region twice is recognized as a normal double click operation, but tapping twice out of the region is allowed to be allocated to another operation.

Function Control Example 8

A function of displaying a keyboard is executed by long-pressing a selective region out of the region, for example, the channel region CH2a below the screen.

Function Control Example 9

A so-called multi-touch detection (multipoint detection) is allowed to be supported. More specifically, in a case where a plurality of users concurrently perform an input operation, or by an operation such as an operation of bringing a plurality of points closer to one another or separating a plurality of points from one another, zooming in or out of a displayed image is allowed to be performed. Application to this multi-touch detection is advantageous, but may cause a detection error. For example, in a case where a user sits in front of the projection surface 110, and performs an operation, for example, writing or drawing, a position of a hand is fixed in general; therefore, such an operation is often performed in a state in which a palm of the user is in contact with the screen. In such a case, a finger or the palm of the user may be concurrently detected, thereby causing a wrong operation. In such a case, only a position of a finger tip is allowed to be selectively detected by signal processing with use of a difference in characteristic points between the finger tip and the palm; however, the following technique is allowed to be adopted.

Even in a state in which the palm is in contact with the screen, an operation of switching to a mode in which the position of one point (the finger tip) is allowed to be selectively detected is performed out of the region. More specifically, switching between a multipoint detection mode and a single point detection mode is performed by an input operation out of the region. By such mode switching, multipoint detection and selective detection of only one point are allowed to be achieved by signal processing. For example, in a writing operation in the single-point detection mode, a relative positional relationship between the finger tip and the palm is almost unchanged; therefore, signal processing in which only a portion corresponding to the finger tip is considered as a detection target and a portion corresponding to the palm is not considered as a detection target, based on the positional relationship is performed. As a result, detection accuracy of the finger tip is improved to lead to an improvement in operability.

As described above, in this embodiment, the image pickup device 13 is disposed in a position optically conjugating with the light valve 12, and light, based on invisible light (a part of near-infrared light reflected by an object) enters the image pickup device 13 through the projection lens 16 and the polarization separation device 15. Therefore, the image pickup signal D0, based on the near-infrared light La1 is allowed to be obtained. An object around the image display region S11a is detected, based on the image pickup signal D0 to determine whether or not a specific input operation is performed, and a specific function is executed, based on a thus-obtained determination result. Accordingly, an input operation for execution of a function is possible in not only the image display region S11a (for example, the projection region S11) but also a region where an image is not displayed, and an enhancement of flexibility of the input operation is possible. Therefore, an improvement in operability by the user is possible.

It is to be noted that the present disclosure is not limited to description of the above-described embodiment, and various modifications are possible. For example, in the above-described embodiment, as the light valve 12 and the image pickup device 13, a light valve and an image pickup device having substantially the same aspect ratio are exemplified; however, the light valve 12 and the image pickup device 13 may not necessarily have the same aspect ratio.

Moreover, in the above-described embodiment, as the light valve of the present disclosure, a reflective liquid crystal device is used; however, the light valve of the present disclosure is not limited thereto, and any other light valve may be used. For example, as the light valve, a digital mirror device (DMD) may be used. In this case, the light valve is of a mirror type that does not use light polarization characteristics; therefore, a polarization optical system is not typically used; however, as with the above-described embodiment, an optical system in which a polarization separation device such as a polarizing beam splitter is provided in an optical path may be provided, and display image with use of the DMD is achievable.

Further, in the above-described embodiment, as an example of the projection display unit of the present disclosure, a so-called ultra short throw projector is exemplified; however, the projection display unit of the present disclosure is not limited thereto, and the present disclosure is widely applicable to projectors of any other kinds. It is to be noted that the effects described in the above-described embodiment and the like are merely examples, and may be other effects, or may further include any other effects.

Moreover, the present disclosure is allowed to have following configurations.

(1)

A projection display unit including:

a projection optical system including an illumination section, a projection lens, and a light valve, the light valve configured to modulate illumination light fed from the illumination section, based on an image signal and emit the modulated illumination light to the projection lens;

a polarization separation device disposed between the light valve and the projection lens and configured to separate incident light into first and second polarized components and emit the first and second polarized components to different directions from each other; and a detection optical system including an image pickup device, the image pickup device disposed in a position optically conjugating with the light valve, in which light, based on invisible light applied along a plane in proximity to a projection surface enters the image pickup device through the projection lens and the polarization separation device, and an input operation is detected in proximity to a projection region on the projection surface, and a specific function is allowed to be executed based on a thus-obtained detection result.

(2)

The projection display unit according to (1), in which, in a position at about a focal length of the projection lens or a position having an optically conjugating relationship with the position, a planar shape corresponding to an effective region of the light valve serves as a first rectangular shape, and a planar shape corresponding to an effective region of the image pickup device serves as a second rectangular shape, the second rectangular shape of which a central position is substantially the same as that of the first rectangular shape and that is larger than the first rectangular shape.

(3)

The projection display unit according to (2), in which the projection display unit is configured to allow a first detection region corresponding to the projection region and a second detection region corresponding to a peripheral region of the projection region to be formable on the projection surface.

(4)

The projection display unit according to (3), in which the second detection region has one or more channel regions or position coordinates, the respective one or more channel regions or position coordinates corresponding to respective input operations.

(5)

The projection display unit according to (4), in which one or more of the channel regions are provided to face each of four sides of a rectangular shape of the projection region.

(6)

The projection display unit according to (4) or (5), in which the function is executed when an object is detected a plurality of times within a predetermined period in one channel region of the plurality of channel regions.

(7)

The projection display unit according to (4) or (5), in which the function is executed when an object is continuously detected within a predetermined period in one channel region of the plurality of channel regions.

(8)

The projection display unit according to (4) or (5), in which the function is executed when, after detecting an object in one channel region of the plurality of channel regions, an object is detected in another channel region of the plurality of channel regions within a predetermined period.

(9)

The projection display unit according to (4) or (5), in which the function is executed when objects are concurrently detected in two or more channel regions different from one another of the plurality of channel regions.

(10)

The projection display unit according to (4) or (5), in which the function is executed when objects are concurrently detected in one channel region of the plurality of channel regions and a selective region in the first detection region.

(11)

The projection display unit according to (3), in which the first detection region includes one or more channel regions around a selective image display region in the projection area, the respective one or more channel regions corresponding to respective input operations.

(12)

The projection display unit according to any one of (1) to (11), in which the projection lens is configured of a short focus lens.

(13)

The projection display unit according to any one of (1) to (12), in which a light source section configured to emit the invisible light is provided on a casing of the projection display unit.

(14)

The projection display unit according to any one of (1) to (13), in which the invisible light is near-infrared light.

(15)

The projection display unit according to any one of (1) to (14), in which the polarization separation device is configured of a polarizing beam splitter.

(16)

The projection display unit according to any one of (1) to (15), in which the light valve is configured of a reflective liquid crystal display device.

(17)

The projection display unit according to (16), in which the polarization separation device has first to fourth surfaces each of which serves as a light incident surface or a light emission surface, and is configured to emit, from the second surface, the first polarized component of light having entered from the first surface, emit, from the third surface, the second polarized component of the light having entered from the first surface, emit, from the fourth surface, the second polarized component of light having entered from the second surface, and emit, from the third surface, the first polarized component of light having entered from the fourth surface.

(18)

The projection display unit according to (17), in which the projection optical system is configured to allow the illumination section to emit the illumination light to the first surface of the polarization separation device, allow the light valve to modulate the first polarized component emitted from the second surface of the polarization separation device of the illumination light and emit the modulated light to the second surface of the polarization separation device, and allow the projection lens to project light emitted from the fourth surface of the polarization separation device of the modulated light to the projection surface.

(19)

The projection display unit according to (18), in which the detection optical system is configured to allow light for object detection to enter a zoom-out optical system through the projection lens and the fourth surface and the third surface of the polarization separation device, and allow light emitted from the zoom-out optical system to enter the image pickup device.

(20)

A function control method including:

determining whether or not a specific input operation is performed in a peripheral region of a projection region, based on an image pickup signal obtained by an optical system, the optical system including a projection lens, a light valve, a polarization separation device, and an image pickup device, the light valve configured to modulate illumination light, based on an image signal and emit the modulated illumination light to the projection lens, the polarization separation device disposed between the light valve and the projection lens, and the image pickup device disposed in a position optically conjugating with the light valve and configured to receive invisible light; and controlling to execute a specific function, based on a thus-obtained determination result.

Alternatively or additionally, the present technology may be configured as below.

(1)

A projection display unit comprising:
a projection optical system including:
an illumination section,
a projection lens, and
a light valve; and
a detection optical system including an image pickup device, the image pickup device being disposed in a position optically conjugating with the light valve,
wherein:
the detection optical system is configured to detect whether an input operation is performed in a peripheral region of a projection region on a projection surface, and in response to detection by the detection optical system in the peripheral region, a specific function is caused to be executed.

(2)

The projection display unit according to (1), wherein:
a first rectangular shape is disposed in a first position at about a focal length of the projection lens or a second position having an optically conjugating relationship with the first position, the first rectangular shape being a planar shape corresponding to an effective region of the light valve, and
a second rectangular shape is disposed such that a central position of the second rectangular shape substantially aligns with a central position of the first rectangular shape, the second rectangular shape being a planar shape corresponding to an effective region of the image pickup device and being larger than the first rectangular shape.

(3)

The projection display unit according to (2), wherein the projection display unit is configured to cause a first detection region corresponding to the projection region and a second detection region corresponding to the peripheral region of the projection region to be formable on the projection surface.

(4)

The projection display unit according to (3), wherein the second detection region has one or more channel regions or position coordinates, the respective one or more channel regions or position coordinates corresponding to respective input operations.

(5)

The projection display unit according to (4), wherein at least one of the one or more channel regions are provided to face each side of four sides of a rectangular shape of the projection region.

(6)

The projection display unit according to (4), wherein in response to detection of an object by the detection optical system a plurality of times within a predetermined period in one channel region of the plurality of channel regions, the specific function is caused to be executed.

(7)

The projection display unit according to (4), wherein in response to continuous detection of an object by the detection optical system within a predetermined period in one channel region of the plurality of channel regions, the specific function is caused to be executed.

(8)

The projection display unit according to (4), wherein in response to detection of an object in one channel region of the plurality of channel regions and of an object in another channel region of the plurality of channel regions within a predetermined period by the detection optical system, the specific function is caused to be executed.

(9)

The projection display unit according to (4), wherein in response to concurrent detection of objects in two or more different channel regions of the plurality of channel regions by the detection optical system, the specific function is caused to be executed.

(10)

The projection display unit according to (4), wherein in response to concurrent detection of objects in one channel region of the plurality of channel regions and a selective region in the first detection region, the specific function is caused to be executed.

(11)

The projection display unit according to (3), wherein the first detection region includes one or more channel regions around a selective image display region in the projection area, the respective one or more channel regions corresponding to respective input operations.

(12)

The projection display unit according to (1), further comprising:

a polarization separation device disposed between the light valve and the projection lens and configured to:

separate incident light into a first polarized component and a second polarized component and emit the first polarized component and the second polarized component to different directions from each other.

(13)

The projection display unit according to (12), wherein the polarization separation device comprises a polarizing beam splitter.

(14)

The projection display unit according to (12), wherein the light valve comprises a reflective liquid crystal display device.

(15)

The projection display unit according to (14), wherein the polarization separation device has a first surface, a second surface, a third surface, and a fourth surface, each of the first surface, the second surface, the third surface, and the fourth surface serves as a light incident surface or a light emission surface, and the polarization separation device is configured to emit:

from the second surface, a first polarized component of light having entered from the first surface, from the third surface, a second polarized component of the light having entered from the first surface, from the fourth surface, a second polarized component of light having entered from the second surface, and from the third surface, a first polarized component of light having entered from the fourth surface.

(16)

The projection display unit according to (15), wherein:

the illumination section is configured to emit illumination light to the first surface of the polarization separation device, the light valve is configured to modulate a first polarized component of the illumination light emitted from the second surface of the polarization separation device and emit the modulated light to the second surface of the polarization separation device, and the projection lens is configured to project light of the modulated light emitted from the fourth surface of the polarization separation device to the projection surface.

(17)

The projection display unit according to (16), wherein the detection optical system is configured to:

receive light for object detection via a zoom-out optical system through the projection lens, the fourth surface of the polarization separation device, and the third surface of the polarization separation device, and transmit light emitted from the zoom-out optical system to the image pickup device.

(18)

The projection display unit according to (12), wherein light based on invisible light emitted along a plane enters the image pickup device through the projection lens and the polarization separation device, the plane being in proximity to the projection surface.

(19)

The projection display unit according to (18), wherein the invisible light comprises near-infrared light.

(20)

The projection display unit according to (18), wherein the projection lens comprises a short throw lens.

(21)

The projection display unit according to (20), wherein a light source section configured to emit the invisible light is provided on a casing of the projection display unit.

(22)

The projection display unit according to (1), wherein the light valve is configured to:

modulate illumination light fed from the illumination section based on an image signal and emit the modulated illumination light to the projection lens.

(23)

A function control method comprising:

projecting to a projection region on a projection surface using a projection optical system including an illumination section, a projection lens, and a light valve;

detecting whether an input operation is performed in a peripheral region of the projection region on the projection surface using a detection optical system including an image pickup device, the image pickup device being disposed in a position optically conjugating with the light valve; and in response to detecting the input operation performed in the peripheral region, causing execution of a specific function.

It should be understood by those skilled in the art that various modifications, combinations, sub-combinations, and alterations may occur depending on design requirements and other factors insofar as they are within the scope of the appended claims or the equivalents thereof.

REFERENCE SIGNS LIST 1 projection display unit
12 light valve
13 image pickup device
14 zoom-out optical system
15 polarization separation device
16 projection lens
17 signal processing section
17A visible light cut filter
17B bandpass filter
18 polarizer
19 function control section
110 projection plane
110A detection light plane
40 near-infrared light source section
A1, A3 effective region
C1, C100 image circle
CH1 to CH4, CH1$a$ to CH4$a$, CH1$b$ to CH4$b$ channel region
E1 exit pupil
S11 projection region
S12 region
L1 illumination light
La, La1 near-infrared light
Lp1, Lp2, Lp3 P-polarized component
Ls1, Ls2, Ls3 S-polarized component
V1 projected image
V2 image information

The invention claimed is:

1. A projection display unit comprising:
   a projection optical system including:
      an illumination section,
      a projection lens, and
      a light valve;
   a detection optical system including an image pickup device, the image pickup device being disposed in a position optically conjugating with the light valve; and
   a light source section that is disposed on a bottom of the projection lens and emits an invisible light parallel to a projection surface onto which light is emitted directly by the projection lens, wherein the invisible light enters the image pickup device through the projection lens, wherein
      the detection optical system is configured to receive, through the projection lens, at least part of the invisible light from the light source section and detect whether an input operation is performed in a peripheral region of a projection region on the projection surface emitted by the invisible light from the light source section, and
      a specific function is caused to be executed in response to:
         detection by the detection optical system in the peripheral region,
         detection of an object in one channel region of a plurality of channel regions and of an object in another channel region of the plurality of channel regions within a predetermined period by the detection optical system,
         concurrent detection of objects in two or more different channel regions of the plurality of channel regions by the detection optical system, and/or
         concurrent detection of objects in one channel region of the plurality of channel regions and a selective region in a first detection region corresponding to the projection region.

2. The projection display unit according to claim 1, wherein:
   a first rectangular shape is disposed in a first position at about a focal length of the projection lens or a second position having an optically conjugating relationship with the first position, the first rectangular shape being a planar shape corresponding to an effective region of the light valve, and
   a second rectangular shape is disposed such that a central position of the second rectangular shape substantially aligns with a central position of the first rectangular shape, the second rectangular shape being a planar shape corresponding to an effective region of the image pickup device and being larger than the first rectangular shape.

3. The projection display unit according to claim 2, wherein the projection display unit is configured to cause the first detection region corresponding to the projection region and a second detection region corresponding to the peripheral region of the projection region to be formable on the projection surface.

4. The projection display unit according to claim 3, wherein the second detection region has one or more channel regions or position coordinates, the respective one or more channel regions or position coordinates corresponding to respective input operations.

5. The projection display unit according to claim 4, wherein at least one of the one or more channel regions are provided to face each side of four sides of a rectangular shape of the projection region.

6. The projection display unit according to claim 4, wherein in response to detection of an object by the detection optical system a plurality of times within a predetermined period in one channel region of the plurality of channel regions, the specific function is caused to be executed.

7. The projection display unit according to claim 4, wherein in response to continuous detection of an object by the detection optical system within a predetermined period in one channel region of the plurality of channel regions, the specific function is caused to be executed.

8. The projection display unit according to claim 3, wherein the first detection region includes one or more channel regions around a selective image display region in the projection area, the respective one or more channel regions corresponding to respective input operations.

9. The projection display unit according to claim 1, further comprising:
   a polarization separation device disposed between the light valve and the projection lens and configured to:
      separate incident light into a first polarized component and a second polarized component and
      emit the first polarized component and the second polarized component to different directions from each other.

10. The projection display unit according to claim 9, wherein the polarization separation device comprises a polarizing beam splitter.

11. The projection display unit according to claim 9, wherein the light valve comprises a reflective liquid crystal display device.

12. The projection display unit according to claim 11, wherein the polarization separation device has a first surface, a second surface, a third surface, and a fourth surface, each of the first surface, the second surface, the third surface, and the fourth surface serves as a light incident surface or a light emission surface, and
   the polarization separation device is configured to emit:
      from the second surface, a first polarized component of light having entered from the first surface,
      from the third surface, a second polarized component of the light having entered from the first surface,
      from the fourth surface, a second polarized component of light having entered from the second surface, and
      from the third surface, a first polarized component of light having entered from the fourth surface.

13. The projection display unit according to claim 12, wherein:
   the illumination section is configured to emit illumination light to the first surface of the polarization separation device,
   the light valve is configured to modulate a first polarized component of the illumination light emitted from the second surface of the polarization separation device and emit the modulated light to the second surface of the polarization separation device, and
   the projection lens is configured to project light of the modulated light emitted from the fourth surface of the polarization separation device to the projection surface.

14. The projection display unit according to claim 13, wherein the detection optical system is configured to:
   receive light for object detection via a zoom-out optical system through the projection lens, the fourth surface of the polarization separation device, and the third surface of the polarization separation device, and transmit light emitted from the zoom-out optical system to the image pickup device.

15. The projection display unit according to claim 1, wherein light based on the invisible light emitted along the plane enters the image pickup device through a polarization separation device, the plane being in proximity to the projection surface.

16. The projection display unit according to claim 15, wherein the invisible light emitted along the plane comprises near-infrared light.

17. The projection display unit according to claim 15, wherein the projection lens comprises a short throw lens.

18. The projection display unit according to claim 17, wherein the light source section is provided on a casing of the projection display unit.

19. The projection display unit according to claim 1, wherein the light valve is configured to:
   modulate illumination light fed from the illumination section based on an image signal and
   emit the modulated illumination light to the projection lens.

20. A function control method comprising:
   projecting to a projection region on a projection surface using a projection optical system including an illumination section, a projection lens, and a light valve;
   emitting an invisible light parallel to the projection surface emitted directly from the projection lens using a light source section that is disposed on a bottom of the projection lens, wherein the invisible light enters the image pickup device through the projection lens;
   using a detection optical system including an image pickup device, receiving, through the projection lens, at least part of the invisible light from the light source section and detecting whether an input operation is performed in a peripheral region of the projection region on the projection surface emitted by the invisible light from the light source, the image pickup device being disposed in a position optically conjugating with the light valve; and
   causing execution of a specific function in response to:
      detecting the input operation performed in the peripheral region,
      detecting an object in one channel region of a plurality of channel regions and of an object in another channel region of the plurality of channel regions within a predetermined period,
      concurrent detecting of objects in two or more different channel regions of the plurality of channel regions, and/or
      concurrent detecting of objects in one channel region of the plurality of channel regions and a selective region in a first detection region corresponding to the projection region.

* * * * *